(12) United States Patent
Krishan

(10) Patent No.: US 12,341,765 B2
(45) Date of Patent: Jun. 24, 2025

(54) METHODS, SYSTEMS, AND COMPUTER READABLE MEDIA FOR DETECTING STOLEN ACCESS TOKENS

(71) Applicant: Oracle International Corporation, Redwood Shores, CA (US)

(72) Inventor: Rajiv Krishan, Cary, NC (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 182 days.

(21) Appl. No.: 17/987,820

(22) Filed: Nov. 15, 2022

(65) Prior Publication Data
US 2024/0163271 A1    May 16, 2024

(51) Int. Cl.
*G06F 21/00* (2013.01)
*H04L 9/40* (2022.01)

(52) U.S. Cl.
CPC ...... *H04L 63/0807* (2013.01); *H04L 63/0876* (2013.01); *H04L 63/12* (2013.01); *H04L 63/1441* (2013.01); *H04L 63/166* (2013.01)

(58) Field of Classification Search
CPC . H04L 63/0807; H04L 63/0876; H04L 63/12; H04L 63/1441; H04L 63/166; H04L 9/3213; H04L 9/3263; H04L 63/0823; G06F 21/33; H04W 12/069
See application file for complete search history.

(56) References Cited

U.S. PATENT DOCUMENTS

| | | | |
|---|---|---|---|
| 1,872,857 | A | 8/1931 | Wesson et al. |
| 5,835,087 | A | 11/1998 | Herz et al. |
| 6,185,612 | B1 | 2/2001 | Jensen et al. |
| 6,298,383 | B1 | 10/2001 | Gutman et al. |
| 7,266,837 | B2 | 9/2007 | Monjas-Llorente et al. |

(Continued)

FOREIGN PATENT DOCUMENTS

| | | |
|---|---|---|
| CN | 1964316 | 5/2007 |
| CN | 103039049 B | 8/2016 |

(Continued)

OTHER PUBLICATIONS

Advisory Action for U.S. Appl. No. 17/557,324, filed Nov. 16, 2023.

(Continued)

*Primary Examiner* — Kendall Dolly
(74) *Attorney, Agent, or Firm* — Jenkins, Taylor & Hunt, P.A.

(57) ABSTRACT

Methods, systems, and computer readable media for detecting stolen access tokens are disclosed. One example method for detecting stolen access tokens comprises: at a network function (NF) comprising at least one processor: receiving, via a transport layer security (TLS) connection and from a sender, a service request comprising an access token, wherein the access token includes ownership information indicating a TLS parameter for verifying an owner of the access token; determining, using the ownership information of the access token and TLS information in a TLS certificate obtained from the sender, whether the ownership information and the TLS information matches; and in response to determining that the ownership information and the TLS information do not match, rejecting the service request.

14 Claims, 11 Drawing Sheets

(56) References Cited

U.S. PATENT DOCUMENTS

| | | | |
|---|---|---|---|
| 8,127,016 | B2 | 2/2012 | Westman et al. |
| 8,171,032 | B2 | 5/2012 | Herz |
| 8,218,459 | B1 | 7/2012 | Stucker |
| 8,218,490 | B2 | 7/2012 | Rydnell et al. |
| 8,626,157 | B2 | 1/2014 | Nas et al. |
| 8,929,360 | B2 | 1/2015 | Agarwal et al. |
| 9,094,819 | B2 | 7/2015 | McCann et al. |
| 9,253,163 | B2 | 2/2016 | Donovan |
| 9,654,483 | B1 | 5/2017 | Benson et al. |
| 9,967,148 | B2 | 5/2018 | Goyal et al. |
| 10,033,736 | B2 | 7/2018 | McCann |
| 10,075,435 | B1 | 9/2018 | Byrd et al. |
| 10,547,613 | B1 | 1/2020 | Roths et al. |
| 10,609,154 | B2 | 3/2020 | Talebi Fard et al. |
| 10,833,938 | B1 | 11/2020 | Rajput et al. |
| 10,834,571 | B1 | 11/2020 | Yau et al. |
| 10,903,999 | B1 | 1/2021 | Raman et al. |
| 11,558,737 | B2 | 1/2023 | Rajput et al. |
| 11,570,689 | B2 | 1/2023 | Rajput et al. |
| 11,627,467 | B2 | 4/2023 | Rajput et al. |
| 11,638,155 | B2 | 4/2023 | Rajput et al. |
| 11,695,563 | B2 | 7/2023 | Rajput et al. |
| 11,888,894 | B2 | 1/2024 | Rajput et al. |
| 12,015,923 | B2 | 6/2024 | Krishan et al. |
| 2003/0227894 | A1 | 12/2003 | Wang et al. |
| 2005/0235000 | A1 | 10/2005 | Keil |
| 2006/0078119 | A1 | 4/2006 | Jee et al. |
| 2006/0155871 | A1 | 7/2006 | Ilkka et al. |
| 2006/0259759 | A1 | 11/2006 | Maino et al. |
| 2007/0019616 | A1 | 1/2007 | Rantapuska et al. |
| 2007/0250642 | A1 | 10/2007 | Thubert et al. |
| 2007/0297419 | A1 | 12/2007 | Askerup et al. |
| 2008/0010669 | A1 | 1/2008 | Aittola et al. |
| 2008/0039104 | A1 | 2/2008 | Gu et al. |
| 2009/0080440 | A1 | 3/2009 | Balyan et al. |
| 2009/0165017 | A1 | 6/2009 | Syed et al. |
| 2009/0232011 | A1 | 9/2009 | Li et al. |
| 2009/0265467 | A1 | 10/2009 | Peles |
| 2009/0305684 | A1 | 12/2009 | Jones et al. |
| 2009/0313379 | A1 | 12/2009 | Rydnell et al. |
| 2010/0291923 | A1 | 11/2010 | Zhou et al. |
| 2011/0165901 | A1 | 7/2011 | Baniel et al. |
| 2011/0195710 | A1 | 8/2011 | Nas et al. |
| 2011/0302244 | A1 | 12/2011 | McCann et al. |
| 2012/0155389 | A1 | 6/2012 | McNamee et al. |
| 2012/0157047 | A1 | 6/2012 | Chen et al. |
| 2012/0158994 | A1 | 6/2012 | McNamee et al. |
| 2012/0226814 | A1 | 9/2012 | Stucker |
| 2013/0097418 | A1 | 4/2013 | Bhatt et al. |
| 2013/0151845 | A1 | 6/2013 | Donovan |
| 2013/0185767 | A1 | 7/2013 | Tirupachur Comerica et al. |
| 2013/0290722 | A1 | 10/2013 | Kall et al. |
| 2016/0029216 | A1 | 1/2016 | Gonsalves et al. |
| 2016/0352696 | A1 | 12/2016 | Essigmann et al. |
| 2017/0012824 | A1 | 1/2017 | Goyal et al. |
| 2017/0214691 | A1 | 7/2017 | McCann |
| 2017/0250815 | A1 | 8/2017 | Cuende et al. |
| 2018/0302414 | A1 | 10/2018 | Wagner et al. |
| 2018/0332471 | A1 | 11/2018 | Zhu |
| 2019/0260803 | A1 | 8/2019 | Bykampadi et al. |
| 2020/0036707 | A1 | 1/2020 | Callahan et al. |
| 2020/0036754 | A1 | 1/2020 | Livanos |
| 2020/0186359 | A1 | 6/2020 | Chan et al. |
| 2020/0213329 | A1 | 7/2020 | Simons |
| 2020/0245139 | A1 | 7/2020 | Nakarmi et al. |
| 2021/0044976 | A1 | 2/2021 | Avetisov et al. |
| 2021/0083965 | A1 | 3/2021 | Taft et al. |
| 2021/0250172 | A1* | 8/2021 | Choyi .................. H04L 9/3239 |
| 2021/0288802 | A1* | 9/2021 | Muhanna .............. H04L 9/3263 |
| 2021/0319132 | A1 | 10/2021 | Zhang et al. |
| 2021/0385286 | A1 | 12/2021 | Wang et al. |
| 2022/0052992 | A1 | 2/2022 | Zhang et al. |
| 2022/0124468 | A1 | 4/2022 | Lu et al. |
| 2022/0217127 | A1* | 7/2022 | Khare .................. H04L 63/0876 |
| 2022/0225084 | A1 | 7/2022 | Rajput et al. |
| 2022/0255931 | A1 | 8/2022 | Avetisov et al. |
| 2022/0345486 | A1 | 10/2022 | Rajput et al. |
| 2022/0346188 | A1 | 10/2022 | Malhotra |
| 2022/0360447 | A1 | 11/2022 | Rajput et al. |
| 2022/0360989 | A1* | 11/2022 | Rajput .................. H04W 12/06 |
| 2022/0360991 | A1 | 11/2022 | Rajput et al. |
| 2022/0361085 | A1 | 11/2022 | Rajput et al. |
| 2022/0369204 | A1 | 11/2022 | Jeong et al. |
| 2023/0015697 | A1 | 1/2023 | Krishnan |

FOREIGN PATENT DOCUMENTS

| | | |
|---|---|---|
| CN | 110290161 A | 9/2019 |
| CN | 110366159 A | 10/2019 |
| CN | 111163473 A | 5/2020 |
| CN | 202180089663.3 | 4/2024 |
| CN | 202280033658.5 | 3/2025 |
| EP | 1 357 720 A1 | 10/2003 |
| EP | 1 848 150 A1 | 10/2007 |
| EP | 1 873 980 A1 | 1/2008 |
| EP | 2 242 205 A1 | 10/2010 |
| EP | 2 220 841 B1 | 9/2011 |
| EP | 2 577 930 A2 | 4/2013 |
| EP | 3 588 862 A1 | 1/2020 |
| EP | 4275368 A | 11/2023 |
| EP | 4 275 368 B1 | 10/2024 |
| JP | 7546778 | 8/2024 |
| KR | 10-1506232 | 3/2015 |
| WO | WO 2007/125498 A1 | 11/2007 |
| WO | WO 2011/082090 A2 | 7/2011 |
| WO | WO 2011/100166 A2 | 8/2011 |
| WO | WO 2011/156274 A2 | 12/2011 |
| WO | WO 2020/053481 A1 | 3/2020 |
| WO | WO 2022/043130 A1 | 3/2022 |
| WO | WO 2022/235372 A1 | 11/2022 |
| WO | WO 2022/235373 A1 | 11/2022 |
| WO | WO 2022/235374 A1 | 11/2022 |
| WO | WO 2022/235462 A1 | 11/2022 |
| WO | WO 2022/235463 A1 | 11/2022 |

OTHER PUBLICATIONS

Office Action for Chinese Patent Application No. 202180089663.3 dated Oct. 20, 2023.

"3rd Generation Partnership Project; Technical Specification Group Services and System Aspects; Security architecture and procedures for 5G system (Release 17)," 3GPP TS 33.501, V17.7.0, pp. 1-292 (Sep. 2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

Jones et al., "JSON Web Token (JWT)," Internet Engineering Task Force (IETF), Request for Comments: 7519, pp. 1-30 (May 2015).

Housley et al. "Internet X.509 Public Key Infrastructure Certificate and CRL Profile," Network Working Group, Request for Comments: 2459, pp. 1-129 (Jan. 1999).

Notice of Grant for Japanese Patent Application Serial No. 2023541627 (Jul. 30, 2024).

Office Action for Chinese Patent Application Serial No. 202280033658.5 (Jul. 17, 2024).

Notice of Allowance and Fee(s) Due for U.S. Appl. No. 17/557,324, filed Jan. 26, 2024.

Non-Final Office Action for U.S. Appl. No. 17/236,775, filed Mar. 15, 2023.

Supplemental Notice of Allowability for U.S. Appl. No. 17/308,972, filed Mar. 1, 2023.

Intent to Grant for European Patent Application Serial No. 21836739.9 (May 3, 2024).

Notice of Allowance and Fee(s) Due for U.S. Appl. No. 17/236,775, filed Sep. 27, 2023.

Corrected Notice of Allowability for U.S. Appl. No. 17/314,382, filed May 26, 2023.

Decision to Grant for European Patent Application Serial No. 21836739.9 (Sep. 12, 2024).

(56) References Cited

OTHER PUBLICATIONS

Interview Summary for U.S. Appl. No. 17/557,324, filed Nov. 14, 2023.
Notification of Transmittal of the International Search Report and the Written Opinion of the International Searching Authority, or the Declaration for International Application No. PCT/US2023/037095 (Feb. 14, 2024).
Chinese Notification to Grant Patent Right for Chinese Patent Application No. 202180089663.3 dated Feb. 29, 2024.
Notice of Allowance and Fee(s) Due for U.S. Appl. No. 17/314,329, filed Dec. 20, 2022.
Notice of Allowance and Fee(s) Due for U.S. Appl. No. 17/308,972, filed Nov. 18, 2022.
Final Office Action for U.S. Appl. No. 17/314,382, filed Nov. 9, 2022.
Restriction Requirement for U.S. Appl. No. 17/314,329, filed Nov. 7, 2022.
Notice of Allowance and Fee(s) Due for U.S. Appl. No. 17/314,300, filed Sep. 27, 2022.
Notice of Allowance and Fee(s) Due and Examiner-Initiated Interview Summary for U.S. Appl. No. 17/145,143, filed Sep. 2, 2022.
Notice of Allowance and Fee(s) Due and Examiner-Initiated Interview Summary for U.S. Appl. No. 17/145,143, filed Aug. 11, 2022.
Non-Final Office Action for U.S. Appl. No. 17/308,972, filed Aug. 5, 2022.
Notification of Transmittal of the International Search Report and the Written Opinion of the International Searching Authority, or the Declaration for International Application No. PCT/US2022/023894 (Aug. 1, 2022).
Notification of Transmittal of the International Search Report and the Written Opinion of the International Searching Authority, or the Declaration for International Application No. PCT/US2022/026418 (Jul. 8, 2022).
Notification of Transmittal of the International Search Report and the Written Opinion of the International Searching Authority, or the Declaration for International Application No. PCT/US2022/026417 (Jul. 8, 2022).
Notification of Transmittal of the International Search Report and the Written Opinion of the International Searching Authority, or the Declaration for International Application No. PCT/US2022/023899 (Jul. 1, 2022).
Notice of Allowance and Fee(s) Due for U.S. Appl. No. 17/314,300, filed Jun. 6, 2022.
Non-Final Office Action for U.S. Appl. No. 17/314,382, filed May 23, 2022.
Non-Final Office Action for U.S. Appl. No. 17/145,143, filed Mar. 15, 2022.
Notification of Transmittal of the International Search Report and the Written Opinion of the International Searching Authority, or the Declaration for U.S. Patent Application Serial No. PCT/US2021/064102 (Apr. 7, 2022).
Commonly-Assigned, co-pending U.S. Appl. No. 17/314,329 for "Methods, Systems, and Computer Readable Media for Protecting Against Mass Network Function (NF) Deregistration Attacks," (Unpublished, filed May 7, 2021).
Commonly-Assigned, co-pending U.S. Appl. No. 17/314,382 for "Methods, Systems, and Computer Readable Media for Single-Use Authentication Messages," (Unpublished, filed May 7, 2021).
Commonly-Assigned, co-pending U.S. Appl. No. 17/314,300 for "Methods, Systems, and Computer Readable Media for Hiding Network Function Instance Identifiers," (Unpublished, filed May 7, 2021).
Commonly-Assigned, co-pending U.S. Appl. No. 17/308,972 for "Methods, Systems, And Computer Readable Media for Generating and Using Single-Use Oauth 2.0 Access Tokens for Securing Specific Service-Based Architecture (SBA) Interfaces," (Unpublished, filed May 5, 2021).
Commonly-Assigned, co-pending U.S. Appl. No. 17/236,775 for "Methods, Systems, and Computer Readable Media for Mitigating Network Function (NF) Update and Deregister Attacks," (Unpublished, filed Apr. 21, 2021).
Ericsson, "New Solution to KI#5: End-to-end integrity protection of HTTP body and method," 3GPP TSG-SA3 Meeting #102Bis-e, pp. 1-3 (Mar. 1-5, 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
Commonly-Assigned, co-pending U.S. Appl. No. 17/145,143 for "Methods, Systems, and Computer Readable Media for Preventing Subscriber Identifier Leakage," (Unpublished, filed Jan. 8, 2021).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).
Nokia et al., "Integrity protection of service request in indirect communication," 3GPP TSG-SA3, Meeting#100e, pp. 1-3 (Aug. 17-28, 2020).
"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).
"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).
Corrected Notice of Allowability for U.S. Appl. No. 15/003,647, filed Jun. 28, 2018.
Communication pursuant to Article 94(3) EPC for European Patent Application Serial No. 11 792 956.2 (Apr. 23, 2018).
Notice of Allowance and Fee(s) Due for U.S. Appl. No. 15/003,647, filed Mar. 7, 2018.
Notice of Allowance and Fee(s) Due for U.S. Appl. No. 14/795,601, filed Dec. 28, 2017.
Applicant Initiated Interview Summary for U.S. Appl. No. 14/795,601, filed Nov. 24, 2017.
Non-Final Office Action for U.S. Appl. No. 15/003,647, filed Oct. 10, 2017.
Non-Final Office Action for U.S. Appl. No. 14/795,601, filed Aug. 18, 2017.
Notification to grant a Chinese patent for Chinese Patent Application No. ZL201180032307.4 (Jun. 23, 2016).

(56) References Cited

OTHER PUBLICATIONS

Extended European Search Report for European Application No. 11792956.2 (Feb. 8, 2016).
Notification of the Third Office Action for Chinese Application No. 201180032307.4 (Jan. 25, 2016).
"RADIUS," https://en.wikipedia.org/wiki/RADIUS#Accounting, pp. 1-17 (Nov. 27, 2015).
Notice of Allowance for U.S. Appl. No. 13/712,481 dated Oct. 20, 2015.
Notice of Allowance for U.S. Appl. No. 13/712,481 dated Sep. 25, 2015.
Notification of the Second Office Action for Chinese Application No. 201180032307.4 (Jul. 17, 2015).
Commonly-Assigned, co-pending U.S. Appl. No. 14/795,601 for "Methods, Systems, and Computer Readable Media for Selective Diameter Topology Hiding," (Unpublished, filed Jul. 9, 2015).
Non-Final Office Action for U.S. Appl. No. 13/832,137, filed Jun. 2, 2015.
Non-Final Office Action for U.S. Appl. No. 13/712,481, filed Apr. 29, 2015.
Notice of Allowance for U.S. Appl. No. 13/154,119 dated Apr. 16, 2015.
Notice of Allowance and Applicant Initiated Interview Summary for U.S. Appl. No. 13/154,119 dated Mar. 17, 2015.
Advisory Action Before the Filing of an Appeal Brief for U.S. Appl. No. 13/712,481, filed Mar. 11, 2015.
Email Regarding Decision to Grant for Korean Patent Application No. 2012-7034449 (Mar. 2, 2015).
Final Office Action for U.S. Appl. No. 13/712,481, filed Dec. 3, 2014.
Notification of the First Office Action for Chinese Patent Application No. 201180032307.4 (Nov. 4, 2014).
Office Action for Korean Patent Application No. 2012-7034449 (Oct. 14, 2014).
Non-Final Office Action for U.S. Appl. No. 13/712,481, filed May 8, 2014.
"5G; Security architecture and procedures for 5G System (3GPP TS 33.501 version 16.6.0 Release 16)," ETSI TS 133 501, V16.6.0, pp. 1-258 (Apr. 2021).
Notice of Preliminary Rejection for Korean Patent Application No. 2012-7034449 (Apr. 25, 2014).
Advisory Action for U.S. Appl. No. 13/154,119 dated Jan. 22, 2014.
Zhang et al., "Tohip: A topology-hiding multipath routing protocol in mobile ad hoc networks," Ad Hoc Networks 21, pp. 109-122 (2014).
Final Office Action for U.S. Appl. No. 13/154,119 dated Oct. 25, 2013.
Notice of Allowance and Fee(s) Due for U.S. Appl. No. 13/021,402, filed Sep. 9, 2013.
Non-Final Office Action for U.S. Appl. No. 13/154,119 dated May 2, 2013.
Communication of European publication number and information on the application of Article 67(3) EPC for European Patent Application No. 11792956.2 (Mar. 13, 2013).
"EliteDSC—LTE Roaming," http://www.elitecore.com/telecompractices/lteroaming.html, pp. 1-2 (Copyright 2013).
Commonly-Assigned, co-pending U.S. Appl. No. 13/712,481 for "Methods, Systems, and Computer Readable Media for Encrypting Diameter Identification Information in a Communication Network," (Unpublished, filed Dec. 12, 2012).
Non-Final Office Action for U.S. Appl. No. 13/021,402, filed Nov. 8, 2012.
Hardt, "The OAuth 2.0 Authorization Framework", Internet Engineering Task Force (IETF) Request for Comments (RFC) 6749, pp. 1-76 (2012).
Notification of Transmital of the International Search Report and the Written Opinion of the International Searching Authority, or the Declaration for International Patent Application No. PCT/US2012/027281 (Jun. 15, 2012).
Notification of Transmittal of the International Search Report and the Written Opinion of the International Searching Authority, or the Declaration for International Application No. PCT/US2012/027263 (Jun. 14, 2012).
Notification of Transmittal of the International Search Report and the Written Opinion of the International Searching Authority, or the Declaration for International Patent Application No. PCT/US2012/027736 (Jun. 12, 2012).
Notification of Transmittal of the International Search Report and the Written Opinion of the International Searching Authority, or the Declaration for International Patent Application No. PCT/US2012/023971 (Jun. 11, 2012).
Notification of Transmittal of the International Search Report and the Written Opinion of the International Searching Authority, or the Declaration for International Patent Application No. PCT/US2012/027269 (Jun. 11, 2012).
Commonly-Assigned, co-pending International Application No. PCT/US12/27736 for "Methods, Systems, and Computer Readable Media for Enriching a Diameter Signaling Message," (Unpublished, filed Mar. 5, 2012).
Commonly-Assigned, co-pending U.S. Appl. No. 13/412,352 titled "Methods, Systems, and Computer Readable Media for Enriching a Diameter Signaling Message," (Unpublished, filed Mar. 5, 2012).
Commonly-Assigned, co-pending International Application No. PCT/US12/27281 for "Methods, Systems, and Computer Readable Media for Hybrid Session Based Diameter Routing," (Unpublished, filed Mar. 1, 2012).
Commonly-Assigned, co-pending U.S. Appl. No. 13/409,949 titled "Methods, Systems, and Computer Readable Media for Hybrid Session Based Diameter Routing," (Unpublished, filed Mar. 1, 2012).
Commonly-Assigned, co-pending International Application No. PCT/US12/27269 for "Methods, Systems, and Computer Readable Media for Dynamically Learning Diameter Binding Information," (Unpublished, filed Mar. 1, 2012).
Commonly-Assigned, co-pending U.S. Appl. No. 13/409,914 titled "Methods, Systems, and Computer Readable Media for Dynamically Learning Diameter Binding Information," (Unpublished, filed Mar. 1, 2012).
Commonly-Assigned, co-pending International Application No. PCT/US12/27263 for "Methods, Systems, and Computer Readable Media for Sharing Diameter Binding Data," (Unpublished, filed Mar. 1, 2012).
Commonly-Assigned, co-pending U.S. Appl. No. 13/409,893 for "Methods, Systems, and Computer Readable Media for Sharing Diameter Binding Data," (Unpublished, filed Mar. 1, 2012).
Notification of Transmittal of the International Search Report and the Written Opinion of the International Searching Authority, or the Declaration for International Application No. PCT/US2011/039285 (Feb. 9, 2012).
Commonly-Assigned, co-pending International Application No. PCT/US12/23971 for "Methods, Systems, and Computer Readable Media for Provisioning A Diameter Binding Repository", (Unpublished, filed Feb. 6, 2012).
Commonly-Assigned, co-pending U.S. Appl. No. 13/366,928 titled "Methods, Systems, and Computer Readable Media for Provisioning A Diameter Binding Repository," (Unpublished, filed Feb. 6, 2012).
Notification of Transmittal of the International Search Report and the Written Opinion of the International Searching Authority, or the Declaration for International Application No. PCT/US2011/023752 (Oct. 26, 2011).
Notification of the Transmittal of the International Search Report and the Written Opinion of the International Searching Authority, or the Declaration for International Application No. PCT/US2010/061934 (Oct. 25, 2011).
Commonly-Assigned, co-pending International Application No. PCT/US11/39285 for "Methods, Systems, and Computer Readable Media for Obscuring Diameter Node Information in a Communication Network," (Unpublished, filed Jun. 6, 2011).

(56) References Cited

OTHER PUBLICATIONS

Commonly-Assigned, co-pending U.S. Appl. No. 13/154,119 for "Methods, Systems, and Computer Readable Media for Obscuring Diameter Node Information in a Communication Network," (Unpublished, filed Jun. 6, 2011).
"Topology Hiding," Chapter 13, Cisco Unified Border Element (SP Edition) Configuration Guide: Distributed Model, pp. 13-1-13-10 (Mar. 29, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
"Digital cellular telecommunications system (Phase 2+); Universal Mobile Telecommunications System (Umts); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QOS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE + ePC = EPS), IMS, PCC and SDM," EFORT, pp. 1-229 (Part 1 of 2) (May 2010).
Znaty, "Diameter, GPRS, (LTE + ePC = EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QOS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).
Chiba et al., "Dynamic Authorization Extensions to Remote Authentication Dial in User Service (Radius)," RFC 5176, pp. 1-31 (Jan. 2008).
"Features—Kamailio (OpenSER) SIP Server," http://www.kamailio.org/w/features/, pp. 1-3 (Copyright 2008-2015).
Rouse, M., "Platform," searchservervirtualization.techtarget.com/definition/platform, pp. 1-2 (Sep. 2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPV4 Application," RFC 4004, pp. 1-53 (Aug. 2005).
Leach et al., "A Universally Unique IDentifier (UUID) URN Namespace," Network Working Group, RFC 4122, pp. 1-32 (Jul. 2005).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
Calhoun et al., "Diameter Base Protocol," RFC 3588, pp. 1-147 (Sep. 2003).
Olson et al., "Support for IPV6 in Session Description Protocol (SDP)," RFC 3266, pp. 1-5 (Jun. 2002).
Calhoun et al., "Diameter Base Protocol, "draft-ietf-aaa-diameter-07, Section 6.3, p. 68 (Jul. 2001).
Calhoun et al., "Diameter Base Protocol," The Internet Society, pp. 1-64 (Mar. 2001).
Rigney et al., "RADIUS Accounting," RFC 2866, pp. 1-28 (Jun. 2000).
Rigney et al., "Remote Authentication Dial in User Service (RADIUS)," RFC 2865, pp. 1-68 (Jun. 2000).
Farago et al., "Virtual path network topology optimization using random graphs," INFOCOM '99, 18th Annual Joint Conference of the IEEE Computer and Communications Societies, vol. 2, pp. 491-496 (Mar. 1999).
Goldschlag et al., "Hiding Routing Information," Springer Berlin Heidelberg, First International Workshop Cambridge, U.K., May 30-Jun. 1, 1996, Information Hiding Lecture Notes in Computer Science, vol. 1174, pp. 137-150 (1996).
Decision to Grant for European Patent Application Serial No. 22720537.4 (Jan. 7, 2025).
First Examination Report for Indian Patent Application Serial No. 202347068773 (Jan. 30, 2025).
Notification to Grant for Chinese Patent Application Serial No. 202280033658.5 (Jan. 27, 2025).
Office Action for European Patent Application Serial No. 22723892.0 (Feb. 6, 2025).

\* cited by examiner

1000

| NF INSTANCE ID | OWNERSHIP/TRUST KEY | OWNERSHIP/TRUST VALUE |
|---|---|---|
| SCP 1 | SAN.DNSNAME | SCP1.SITE.COM |
| SCP 2 | SAN.DNSNAME | SCP2.SITE2.COM |
| SEPP 1 | SAN.DNSNAME | SEPP1.SITE.COM |
| SEPP 2 | SAN.DNSNAME | SEPP2.SITE2.COM |
| SMF 1 | SAN.REGISTEREDID | SMF 1 |
| SMF 2 | SAN.IPADDRESS | 233.45.69.22 |
| AMF 1 | SAN.IPADDRESS | 233.45.67.4 |
| AMF 2 | SAN.REGISTEREDID | AMF 2 |
| NRF 1 | SAN.OTHERNAME | 2967A69A-F61B-4BC1-B9DA-47C9C5D14B64 |
| NRF 2 | SAN.DNSNAME | NRF2.SITE.COM |
| NRF 3 | SAN.IPADDRESS | 233.45.65.34 |

RECEIVE, VIA A TRANSPORT LAYER SECURITY (TLS) CONNECTION AND FROM A SENDER, A SERVICE REQUEST COMPRISING AN ACCESS TOKEN, WHEREIN THE ACCESS TOKEN INCLUDES OWNERSHIP INFORMATION OWNERSHIP INFORMATION INDICATING A TLS PARAMETER FOR VERIFYING AN OWNER OF THE ACCESS TOKEN

1104

DETERMINE, USING THE OWNERSHIP INFORMATION OF THE ACCESS TOKEN AND TLS INFORMATION IN A TLS CERTIFICATE OBTAINED FROM THE SENDER, WHETHER THE OWNERSHIP INFORMATION AND THE TLS INFORMATION MATCHES

1106

IN RESPONSE TO DETERMINING THAT THE OWNERSHIP INFORMATION AND THE TLS INFORMATION DO NOT MATCH, REJECT THE SERVICE REQUEST

FIG. 11

METHODS, SYSTEMS, AND COMPUTER READABLE MEDIA FOR DETECTING STOLEN ACCESS TOKENS

TECHNICAL FIELD

The subject matter described herein relates to security in telecommunications networks. More particularly, the subject matter described herein relates to methods, systems, and computer readable media for detecting stolen access tokens.

BACKGROUND

In fifth generation (5G) telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with an NF repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

The current security procedure defined in 3GPP TS 33.501 for accessing service-based architecture (SBA) interfaces is referred to as service access authorization. The messages used to access SBA interfaces are referred to as service-based interface (SBI) messages, and the services provided on the interfaces are referred to as SBI services. According to the service access authorization procedure, a consumer NF seeking to access an SBI service provided by a producer NF must obtain an OAuth 2.0 access token from the NRF. To obtain the OAuth 2.0 access token from the NRF, the consumer NF sends an access token request to the NRF. The NRF validates the request, generates an access token, and returns the access token to the consumer NF. When the consumer NF seeks to access the service, the consumer NF sends an SBI service request message to the producer NF. The SBI service request message includes the access token obtained from the NRF. The producer NF verifies the integrity of the claims (e.g., attributes) in the access token and, if the claims are valid, the producer NF provides access to the requested service.

One problem with this architecture is that an access token can be stolen and used by hackers to obtain services from producer NFs without authorization and/or to perform attacks. Even though an access token has an expiration time, because the access token can be re-used, a hacker who steals the access token can use the access token maliciously to access SBI services and/or perform a denial of service attack (e.g., by sending a large number of service requests with high priorities to one or more producer NF(s)) before the expiration time.

SUMMARY

Methods, systems, and computer readable media for detecting stolen access tokens are disclosed. One example method for detecting stolen access tokens comprises: at a network function (NF) comprising at least one processor: receiving, via a transport layer security (TLS) connection and from a sender, a service request comprising an access token, wherein the access token includes ownership information indicating a TLS parameter for verifying an owner of the access token; determining, using the ownership information of the access token and TLS information in a TLS certificate obtained from the sender, whether the ownership information and the TLS information matches; and in response to determining that the ownership information and the TLS information do not match, rejecting the service request.

One example system for detecting stolen access tokens includes at least one processor, a memory, and an NF using the at least one processor and the memory. The NF is configured for: receiving, via a TLS connection and from a sender, a service request comprising an access token, wherein the access token includes ownership information indicating a TLS parameter for verifying an owner of the access token; determining, using the ownership information of the access token and TLS information in a TLS certificate obtained from the sender, whether the ownership information and the TLS information matches; and in response to determining that the ownership information and the TLS information do not match, rejecting the service request.

One example non-transitory computer readable medium comprising computer executable instructions embodied in the non-transitory computer readable medium that when executed by at least one processor of an NF cause the NF to perform steps comprising: receiving, via a TLS connection and from a sender, a service request comprising an access token, wherein the access token includes ownership information indicating a TLS parameter for verifying an owner of the access token; determining, using the ownership information of the access token and TLS information in a TLS certificate obtained from the sender, whether the ownership information and the TLS information matches; and in response to determining that the ownership information and the TLS information do not match, rejecting the service request.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 10 depicts example ownership data usable for determining ownership attributes for access tokens; and FIG. 11 is a flow chart illustrating an example process for detecting stolen access tokens.

DETAILED DESCRIPTION

Figure 1:
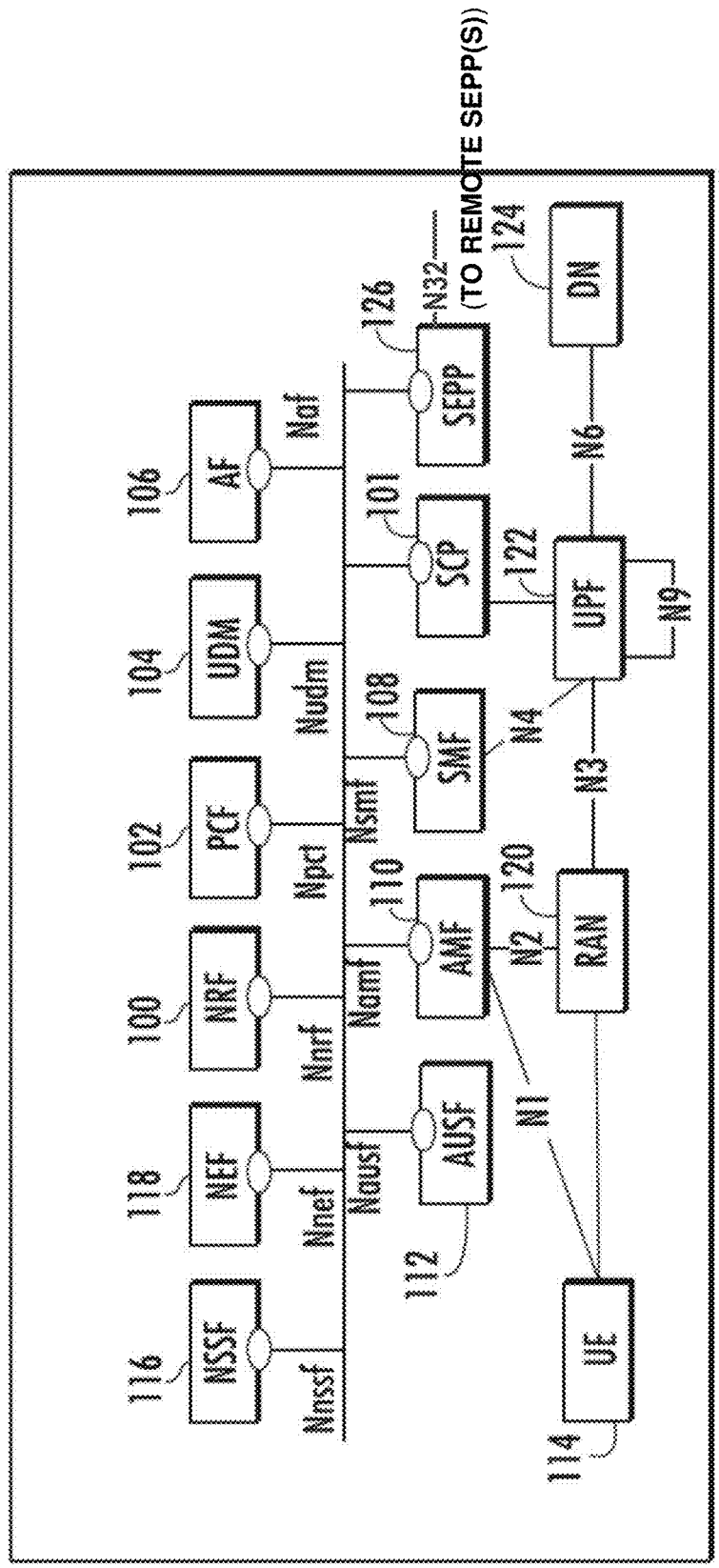
FIG. 1 is a network diagram illustrating an example fifth generation (5G) network architecture.

The subject matter described herein relates to methods, systems, and computer readable media for detecting stolen access tokens. As stated above, one problem with 5G service-based interface (SBI) architecture is that an access token can be stolen and used by hackers or malicious entities to obtain services from producer network functions (NFs) without authorization and/or to implement denial of service attacks. Even though an access token has an expiration time, because the access token can be re-used, a hacker or malicious entity who steals the access token can use the access token maliciously to access SBI services and/or to perform a denial of service attack (e.g., by sending a large number of service requests with high priorities to one or more producer NF(s)) before the access token expires.

Generally, a node or NF is unable to detect when an access token (e.g., an OAuth 2.0 access token, a JSON web token (JWT), etc.) is stolen and used by a malicious entity because the required content (e.g., claims or attributes) in the access token does not indicate if an access token using entity is different from the entity that owns the access token. For example, attributes (e.g., 3GPP defined claims) in an OAuth 2.0 access token may or may not be present in the header or body attributes of service request. Thus, a receiving entity (e.g., a producer NF or an intermediate proxy NF) may not use attributes in OAuth 2.0 access token to do custom validation (e.g., for ensuring that the access token is being used by its legitimate owner). Further, even when attributes an OAuth 2.0 access token are also in header or body attributes of a service request, a malicious entity can copy those attribute values as well (along with the OAuth 2.0 access token) in its service request. Thus, even then, the receiving entity would not be able to detect the use of the OAuth 2.0 access token by the malicious entity. To address these issues, an access token may need ownership information (e.g., one or more attribute(s) unique to a given consumer NF) usable for verifying the owner of the access token and that uses a validation or verification technique that is not easily defeated, e.g., by copying the appropriate information into a service request.

In accordance with some aspects of the subject matter described herein, methods, systems, mechanisms, and/or techniques for using transport layer security (TLS) data to determine whether an access token is sent by its owner (e.g., the entity that requested the access token from a token creator or authorization server). For example, when sending or forwarding service-based interface (SBI) messages, a TLS connection may be established between consecutive or adjacent hops (e.g., a consumer NF and a first hop) by performing a TLS handshake protocol where the endpoints (e.g., NF) exchange TLS certificates (e.g., X.509v3 certificates). In this example, each TLS certificate may utilize a subject alternative names (SAN) extension to indicate a domain name system (DNS) name, an internet protocol (IP) address, or a uniform resource identifier (URI) that identifies the subject of the TLS certificate and the SAN data is difficult to spoof since it is verified by the certificate authority. In some embodiments, when a first hop NF (e.g., a module or node) in accordance with various aspects described herein receives, from a consumer NF, a service request including an access token, the first hop NF may compare ownership information (e.g., a value for a TLS parameter identifying or associated with the owner of the access token) in the access token to an actual value of the TLS parameter in a TLS certificate (previously received from the consumer NF during the TLS handshake). In such embodiments, if the ownership information matches the SAN identifier, then the first hop NF may determine that the consumer NF is the owner of the access token. However, in such embodiments, if the ownership information does not match the SAN identifier, then the first hop NF may determine that the consumer NF is not the owner of the access token (e.g., that the access token is stolen or compromised) and may perform a mitigation action (e.g., rejecting the service request with an error response message).

In accordance with some aspects of the subject matter described herein, methods, systems, mechanisms, and/or techniques for including ownership information in access tokens (e.g., an OAuth 2.0 access token, a JWT, etc.) are provided. For example, an NF repository function (NRF) (e.g., a module or node) in accordance with various aspects described herein may be configured for receiving ownership information (e.g., attributes or claims indicating a TLS parameter and a value for the TLS parameter identifying or associated with the owner of the access token) identifying a consumer NF when the consumer NF requests an access token for accessing services of a producer NF. In this example, the NRF may be configured for generating the access token comprising appropriate ownership attributes (e.g., claims), e.g., based on the received ownership information. In another example, the NRF may be configured for receiving ownership information for identifying a 5G core NF (e.g., a service communication proxy (SCP), a security edge protection proxy (SEPP), etc.) when the 5G core NF registers with the NRF. In this example, the NRF may be configured for generating a trust token (e.g., an OAuth 2.0 access token, a JWT, etc.) comprising appropriate ownership attributes (e.g., claims), e.g., based on the received ownership information. Continuing with this example, the 5G core NF may add the trust token as a header to a service request when providing the service request toward a producer NF, where the trust token may indicate that the ownership of the access token has already been verified.

In accordance with some aspects of the subject matter described herein, methods, systems, mechanisms, and/or techniques for detecting stolen access tokens are provided. For example, an NF and/or a module in accordance with various aspects described herein may be configured for: receiving, via a TLS connection and from a sender, a service request comprising an access token, wherein the access token includes ownership information indicating a TLS parameter for verifying an owner of the access token; determining, using the ownership information (e.g., an IP address identifying or associated with the owner of the access token of the access token and TLS information (e.g., a SAN parameter IP address) in a TLS certificate obtained from the sender, whether the ownership information and the TLS information matches; and in response to determining that the ownership information and the TLS information do not match, rejecting the service request.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of an FQDN, an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP 126 in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs 126 usable for performing an initial handshake (e.g., a TLS handshake) and negotiating various parameters for an N32-f interface connection and related message forwarding. An N32-f interface is a forwarding interface between two SEPPs 126 usable for forwarding various communications (e.g., 5GC requests) between a consumer NF and a producer NF after applying application level security protection.

As stated above, one problem with security in 5G and subsequent generation networks is that 3GPP TS 33.501 suggests the use of the OAuth 2.0 framework for authorization, and an OAuth 2.0 access token issued by the NRF can be used multiple times before expiration. Because the access token can be used multiple times, it can be misused by a hacker if stolen. 3GPP TS 33.501 does not provide techniques for enforcing that an access token is only used by its owner nor provide techniques for detecting stolen or compromised access tokens.

It will be appreciated that FIG. 1 is for illustrative purposes and that various nodes and/or modules, locations, and/or functionality described above in relation to FIG. 1 may be changed, altered, added, or removed.

Figure 2:
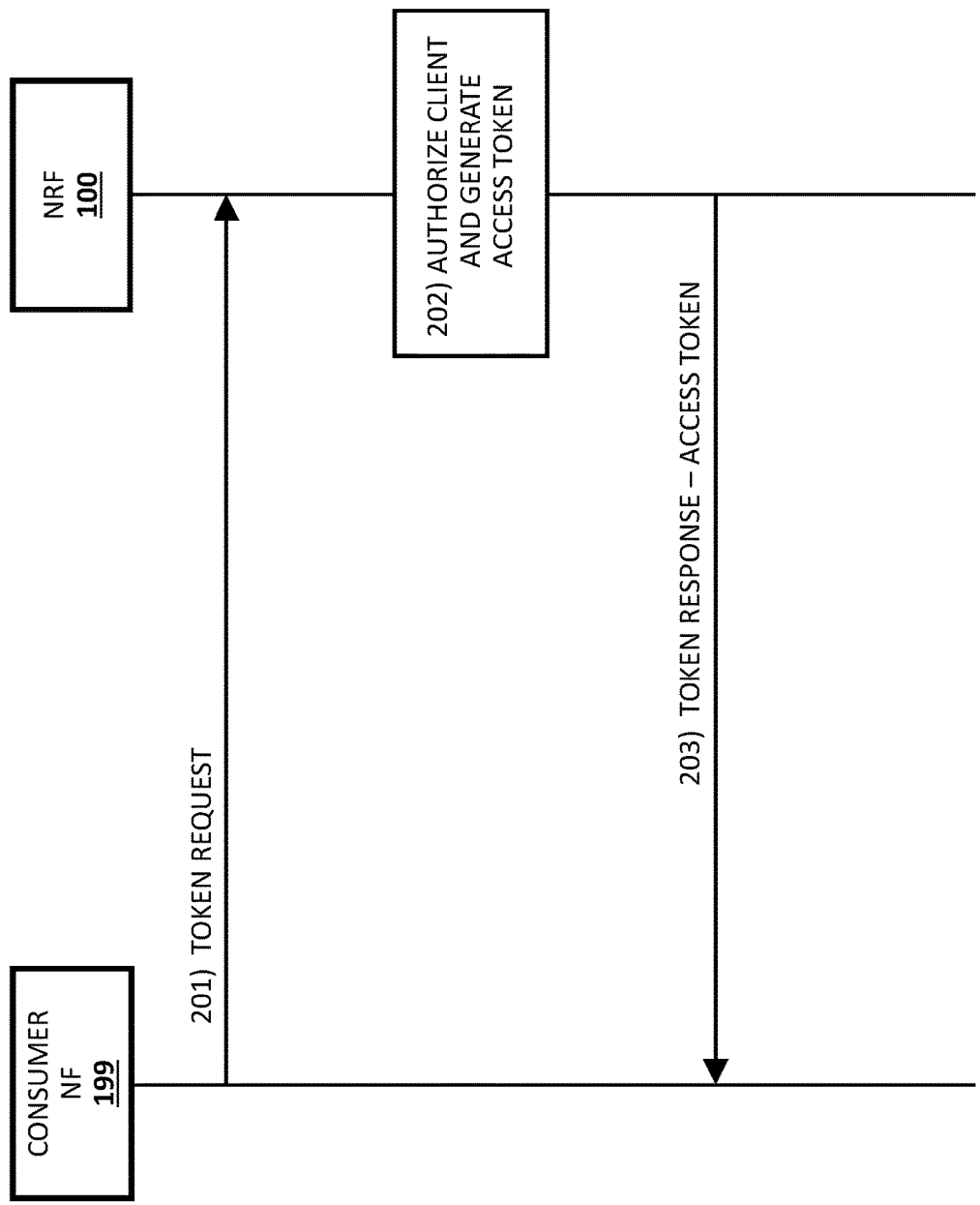
FIG. 2 is a message flow diagram illustrating a scenario involving obtaining an access token from a network function (NF) repository function (NRF)

FIG. 2 is a message flow diagram illustrating a scenario 200 involving obtaining an access token from NRF 100. As depicted, scenario 200 includes aspects of an example service access token authorization process, e.g., as defined in Section 13.4 of 3GPP TS 33.501.

Referring to FIG. 2, in step 201, a consumer NF 199 (also referred to herein as an NF service consumer) may send a token request message (e.g., an Nnrf_AccessToken_Get request message) for requesting an access token (e.g., an OAuth 2.0 access token) to NRF 100 (e.g., acting as an OAuth 2.0 authorization server). The token request message may include expected service names, a producer NF type, a consumer NF type, a client ID, and/or other parameters.

In step 202, NRF 100 may authorize consumer NF 199 (e.g., using client ID and/or other parameters) and may generate an access token (e.g., an OAuth 2.0 access token).

In step 203, NRF 100 may send the access token to consumer NF 199 in a token response message (e.g., an Nnrf_AccessToken_Get response). The access token may include an expiration time and/or other attributes or claims. However, the access token can still be stolen and reused prior to the expiration time.

It will be appreciated that FIG. 2 is for illustrative purposes and that different and/or additional actions may be performed. It will also be appreciated that various actions described herein may occur in a different order or sequence.

Figure 3:
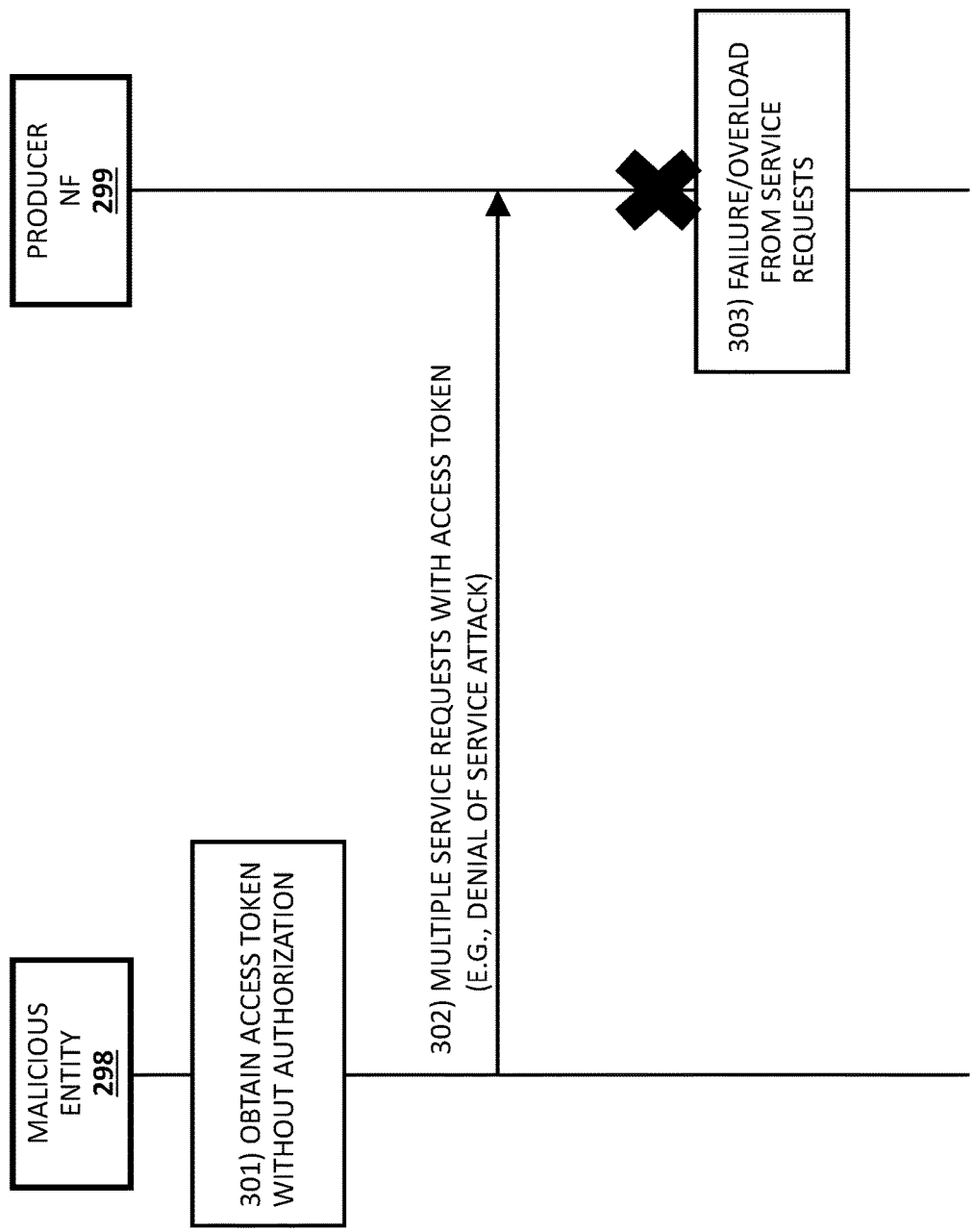
FIG. 3 is a message flow diagram illustrating an example denial of service (DoS) attack scenario involving a stolen access token.

FIG. 3 is a message flow diagram illustrating an example denial of service (DoS) attack scenario 300 involving an access token. As depicted in FIG. 3, a malicious entity 298 may perform or initiate a DoS or distributed DoS (DDoS) attack on a producer NF 299. For example, malicious entity 298 may represent an entity that has stolen or otherwise obtain an access token without authorization (e.g., by exploiting a network security issue or an application vulnerability) and/or attempts to use an access token to cause one or more issues, e.g., DoS attacks on producer NF 299.

In some embodiments, malicious entity 298 may represent, include, or utilize one or more NF(s), node(s), or endpoint(s) for interacting with various NFs, e.g., producer NF 299. For example, malicious entity 298 may attempt to perform a DoS attack against producer NF 299 by sending a large number of service requests (each service request with high 3gpp-Sbi-Message-Priority values and a stolen access token) from multiple endpoints and, as such, may attempt to overload producer NF 299 to cause DoS or to cause service issues for various consumer NFs 199.

Referring to FIG. 3, in step 301, malicious entity 298 may obtain an access token without authorization. For example, malicious entity 298 may obtain the access token obtained by consumer NF 199 in FIG. 2 by exploiting a network security issue or an application vulnerability.

In step 302, malicious entity 298 may send a large number of NF service requests (e.g., at a high rate) to a producer NF 299. For example, each NF service request may include an access token originally obtained from NRF 100 by consumer NF 199. In some embodiments, if the scope of the access token allows usage at multiple or different producer NFs 299 (e.g., an NF set), malicious entity 298 may send the service requests to multiple or different producer NFs 299 in an attempt to overload these producer NFs 299 and cause service issues for various consumer NFs 199.

In some embodiments, for each service request, producer NF 299 may receive the service request and validate or verify a related access token thereof. For example, producer NF 299 may verify or validate the integrity and attributes (e.g., claims) of the access token and, if verification or validation is successful, may execute or provide the requested service.

In some embodiments, producer NF 299 may validate an access token (e.g., an OAuth 2.0 access token) by ensuring the integrity of the access token by verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In step 303, producer NF 299 may experience a failure or overload in response to the onslaught of high priority service requests from malicious entity 298. For example, if producer NF 299 is configured for handling high-priority service requests first (e.g., regardless of receipt time) and if malicious entity 298 sends a significantly large amount of such service requests, then producer NF 299 may be incapable of providing services to other consumer NFs 199, thereby malicious entity 298 has effectively cause other consumer NFs 199 to be denied service from producer NF 299.

Thus, FIG. 3 illustrates that as long as the access token has valid claims, malicious entity 298 (e.g., a hacker) can access a service provided by producer NF 299 with a stolen access token and/or cause various related issues. It should be noted that the access token in FIG. 3 can used with multiple different SBI request messages and is not specific to an SBI request message or message type.

Table 1 shown below illustrates attributes, which are also referred to as claims, that are included in an OAuth 2.0 access token. The complete claims data structure for an OAuth 2.0 access token is defined in Table 6.3.5.2.4-1 of 3GPP TS 29.510.

TABLE 1

OAuth 2.0 Access Token Claims

| Attribute Name | Description |
| --- | --- |
| iss | Issuer NRF NF Instance Id |
| sub | Consumer NF Instance Id |
| aud | Producer(s) details |
| scope | Producer Service Names, resource/operation-level scopes |
| exp | Expiration Time |
| consumerPlmnId | Consumer PlmnId |
| producerPlmnId | Producer PlmnId |
| producerSnssailist | Array(Snssai) |
| producerNsiList | Array(string) |
| producerNFSetId | ProducerNfSetId |

As shown in Table 1, an OAuth 2.0 access token may include various claims that identify an issuing NRF, a producer NF, an expiration time, a consumer PLMN, a producer PLMN, producer network slice identifying information, and producer NF set identifying information. However, there is no claim in the defined format for the OAuth 2.0 access token that prevents a hacker from stealing the access token and using the access token to gain unauthorized access to a service provided by a producer NF or otherwise misusing the access token. Moreover, there is no claim in the defined format for the OAuth 2.0 access token that prevents a hacker from stealing the access token and using the access token to gain unauthorized access to a service provided by a producer NF or otherwise misusing the access token.

The following is an example of access token claims that may be carried in encoded text format in an OAuth 2.0 access token for AMF 110:

```
{
   "iss": "6faf1bbc-6e4a-4454-a507-a14ef8e1bc5c",
   "sub": "6faf1bbc-6e4a-4454-a507-a14ef8e1dc5d",
   "aud": [
   "6faf1bbc-6e4a-4454-a507-b14ef8e1bc4c"
   ],
   "scope" : "namf-mt",
   "exp": 1586169019
}
```

In the illustrated example above, the access token claims include an issuer NF instance ID, a consumer NF instance ID, producer NF details, a scope of the token, and an expiration time. However, as indicated above, a hacker can copy the OAuth 2.0 access token claims and use the access token to access a service provided by producer NF 299 and/or to initiate a denial of service attack on producer NF 299.

As stated above, 3GPP TS 33.501 suggests using the OAuth 2.0 access token for authorization for SBI communications. A hacker having access to a stolen OAuth 2.0 access token can use the stolen access token to invoke SBI messages in the network. Hence, there is a need to detect stolen or compromised access token since detection can mitigate or even prevent the usage of stolen or compromised access tokens.

It will be appreciated that FIG. 3 is for illustrative purposes and that different and/or additional actions may be performed. It will also be appreciated that various actions described herein may occur in a different order or sequence.

Figure 4:
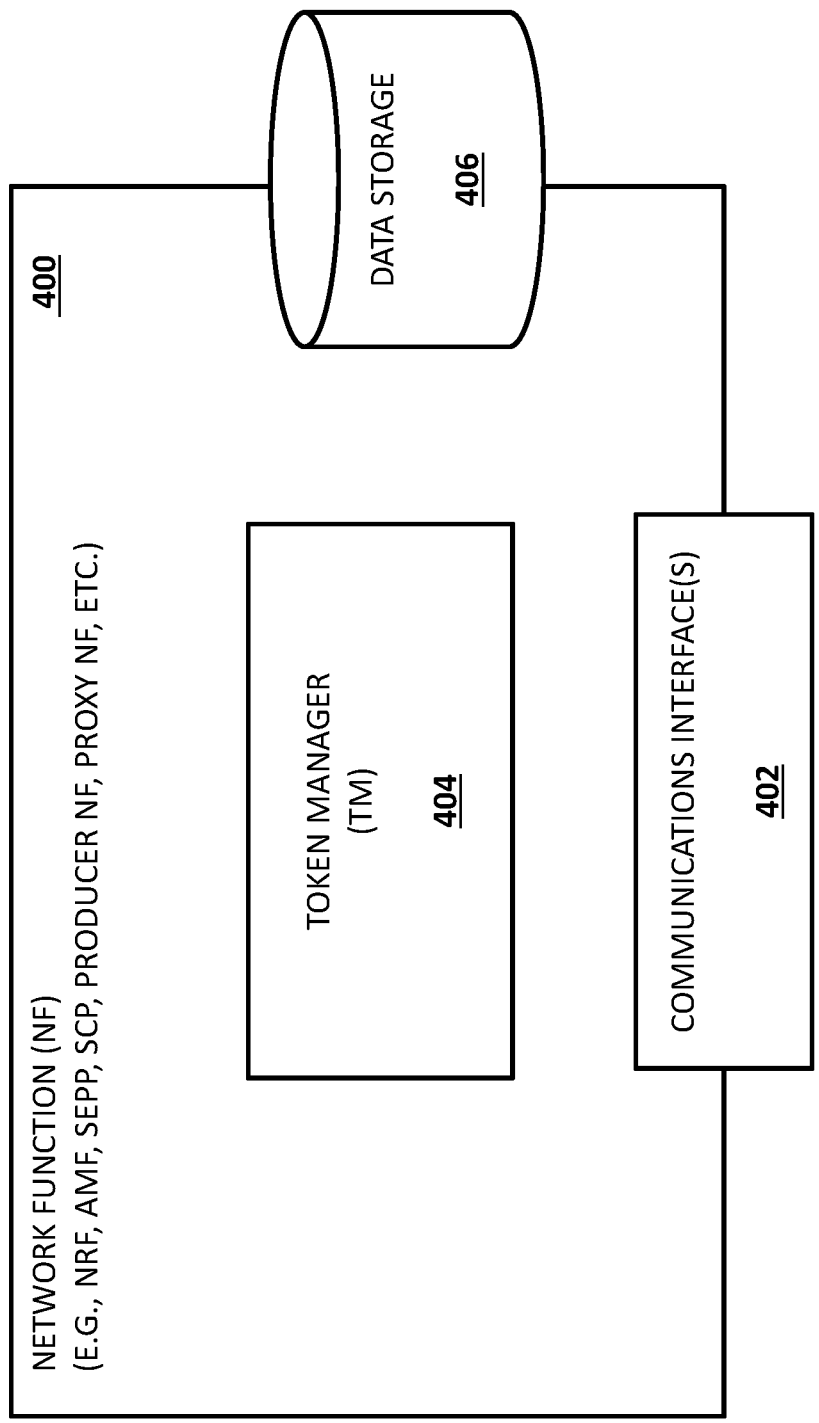
FIG. 4 is a block diagram illustrating an example NF for detecting stolen access tokens.

FIG. 4 is a diagram illustrating an example NF 400 for detecting stolen access tokens. NF 400 may represent any suitable entity (e.g., one or more node(s), device(s), or computing platform(s)) for performing various aspects associated with generating, sending, or using access tokens with ownership information (e.g., data or attribute(s) that indicates information to be compared to TLS certificate data) for determining whether a sender is the owner of the access token and/or to mitigate unauthorized use (e.g., by a malicious entity 298).

In some embodiments, NF 400 may represent or include an authorization server, a data repository, a network gateway, a network proxy, an edge security device, or other functionality. In some embodiments, NF 400 may represent or include one or more 5GC NFs. For example, NF 400 may represent or include NRF 100, SEPP 126, SCP 101, producer NF 299, AF 106, AMF 110, SMF 108, NEF 118, PCF 102, etc.

Referring to FIG. 4, NF 400 may include one or more communications interface(s) 402 for communicating messages via a communications environment, e.g., one or more 5G or 5GC networks. For example, communications interface(s) 402 may include one or more communication interfaces for communicating with various entities in a home network (e.g., home PLMN (H-PLMN)) or a visited network (e.g., a visited PLMN (V-PLMN)).

NF 400 may include TM 404. TM 404 may be any suitable entity (e.g., software executing on at least one processor) for performing one or more aspects associated with detecting stolen or compromised access tokens. In some embodiments, NF 400 and/or TM 404 may include functionality for using TLS certificate data along with ownership information (e.g., custom or private claims indicating a TLS parameter and a value for the TLS parameter identifying or associated with the owner of the access token) in an access token to determine whether an access token is sent by its owner (e.g., the NF that requested the access token from a token creator or authorization server).

In some embodiments, when sending or forwarding SBI messages, a TLS connection may be established between consecutive or adjacent hops (e.g., a consumer NF and a first hop) and involve performing a TLS handshake protocol. For example, the TLS handshake protocol defined in Internet Engineering Task Force (IETF) Request for Comments (RFC) 5246 including the exchange of certificate messages by both ends of the TLS connection may be used. The structure of a TLS handshake message defined in IETF RFC 5246, including the certificate message, appears below:

```
enum {
hello_request(0), client_hello(1), server_hello(2),
certificate(11), server_key_exchange (12),
certificate_request(13), server_hello_done(14),
certificate_verify(15), client_key_exchange(16),
finished(20), (255)
} HandshakeType;
struct {
HandshakeType msg_type; /* handshake type */
uint24 length; /* bytes in message */
select (HandshakeType) {
case hello_request: HelloRequest;
case client_hello: ClientHello;
case server_hello: ServerHello;
case certificate: Certificate;
case server_key_exchange: ServerKeyExchange;
case certificate_request: CertificateRequest;
case server_hello_done: ServerHelloDone;
case certificate_verify: CertificateVerify;
case client_key_exchange: ClientKeyExchange;
case finished: Finished;
} body;
} Handshake;
```

As illustrated by the TLS handshake message structure above, one of the defined handshake message types is a certificate message, which contains the certificate of the client or server, depending on whether the sender is functioning as a client or a server. In establishing secure TLS communications over a 5G interface, mutual TLS is used where both ends of the TLS connection receive and validate the other end's X.509 certificate. IETF RFC 5246 indicates that the type of certificate must be X.509v3 unless expressly negotiated otherwise. At least some examples described herein may refer to the X.509v3 certificate, but the subject matter described herein is not limited to using data in an X.509v3 certificate when verifying ownership of an access token or trust token.

The X.509v3 certificate format is defined in IETF RFC 3280. According to IETF RFC 3280, one extension that may be included in an X.509v3 certificate is the SAN extension. The SAN extension is defined as follows:

The subject alternative names extension allows additional identities to be bound to the subject of the certificate. Defined options include an Internet electronic mail address, a DNS name, an IP address, and a uniform resource identifier (URI). Other options exist, including completely local definitions. Multiple name forms, and multiple instances of each name form, MAY be included. Whenever such identities are to be bound into a certificate, the subject alternative name (or issuer alternative name) extension MUST be used, however, a DNS name MAY be represented in the subject field using the domainComponent attribute as described in section 4.1.2.4. Because the subject alternative name is considered to be definitively bound to the public key, all parts of the subject alternative name MUST be verified by the CA.

As indicated above, the SAN extension of the X.509v3 certificate may contain a DNS name, IP address, a URI, or other information that identifies the subject of the certificate and this SAN data is verified by the certificate authority. Because the SAN data is verified by the certificate authority, the SAN data is difficult to spoof. Hence, by comparing TLS certificate data (e.g., a SAN IP address parameter value) and a value for the TLS parameter identifying or associated with the owner of the access token (e.g., stored as ownership related attributes or private claims) in an access token, NF 400 and/or TM 404 may determine whether the sender of the access token is also the owner. For example, if a value for a TLS parameter located in a private claim of an access token matches the value of the TLS parameter from a TLS certificate (e.g., previously received from consumer NF 199 during the TLS handshake), then NF 400 and/or TM 404 may determine that consumer NF 199 is the owner of the access token. However, if the values do not match, then NF 400 and/or TM 404 may determine that consumer NF 199 is not the owner of the access token (e.g., that the access token is stolen or compromised) and may perform a mitigation action (e.g., reject the service request with an error response message).

In some embodiments, NF 400 and/or TM 404 may include functionality for including ownership information in access tokens and/or trust tokens (e.g., an OAuth 2.0 access token, a JWT, etc.). For example, where NF 400 includes NRF 100 or related functionality, NF 400 may be configured for receiving ownership information (e.g., attributes indicating a TLS parameter and a value for the TLS parameter) identifying consumer NF 199 when consumer NF 199 requests an access token from NF 400. In this example, NF 400 may be configured for generating the access token comprising appropriate ownership attributes (e.g., claims) using the received ownership information.

In some embodiments, where NF 400 includes NRF 100 or related functionality, NF 400 may be configured for receiving ownership information identifying a 5G core NF (e.g., SCP 101, SEPP 126, etc.) when the 5G core NF registers with NF 400. For example, NF 400 may be configured for generating a trust token (e.g., an OAuth 2.0 access token, a JWT, etc.) comprising appropriate ownership attributes (e.g., claims) based on ownership information received from a 5G core NF during a registration procedure with NF 100. In this example, after verifying ownership of an access token from consumer NF 199, the 5G core NF may add the trust token as a header to the service request when providing or forwarding the service request toward producer NF 299, and the trust token may indicate to a next hop that the ownership of the access token has already been verified.

In some embodiments, NF 400 and/or TM 404 may include functionality for determining whether access tokens require or will include ownership information. For example, a network operator may include criteria or rules for causing some NFs to utilize access tokens with ownership information. In this example, the criteria or rules may be based on various factors, e.g., NF type, network or location, historical data (e.g., known security issues in a network or at an NF), and/or expected workloads or traffic volumes.

In some embodiments, NF 400 and/or TM 404 may include functionality for detecting stolen or compromised access tokens. For example, NF 400 and/or TM 404 may be configured for: receiving, via a TLS connection and from a sender, a service request comprising an access token, wherein the access token includes ownership information indicating an owner of the access token; determining, using the ownership information (e.g., a value for a particular SAN parameter identifying or associated with the owner of the access token) of the access token and TLS information (e.g., the SAN parameter value, such as a DNS name, IP address, an email address, etc.) in a TLS certificate obtained from the sender, whether the ownership information and the TLS information matches; and in response to determining that the ownership information and the TLS information do not match, performing a mitigation action, such as rejecting the service request.

In some embodiments, NF 400 and/or TM 404 may include functionality for verifying the owner or subject of a trust token. For example, where NF 400 is not the first hop from a sender of service request including an access token, NF 400 and/or TM 404 may detect a trust token in a header of the service request and may verify or attempt to verify that the trust token is from the immediate previous hop. In this example, a trust token verification procedure may involve using ownership information of the trust token to identify a value for a TLS parameter that is associated with or identifies the owner of the trust token and then obtaining the TLS parameter value from the TLS certificate (e.g., obtained from the immediate previous hop during a TLS handshake protocol). If the two values match (e.g., the values are equal or the same), then NF 400 and/or TM 404 may determine that the immediate previous hop is the true owner or subject of the trust token. However, if the two values do not match (e.g., the values are different), then NF 400 or TM 404 therein may determine that the immediate previous hop is not the true owner or subject of the trust token (e.g., that the trust token is stolen or compromised) and may perform a mitigation action, such as rejecting the service request.

In some embodiments, access tokens or trust tokens generated or used by NF 400 or TM 404 (or other entities) may include a JSON web token (JWT), e.g., as defined in request for comments (RFC) 7519. In such embodiments, each token may include or indicate custom or private attributes (e.g., "Private Claim Names" or vendor specific claims) usable for indicating or providing ownership information. For example, when generating or issuing an access token, NF 400 acting as NRF 100 may add an 'owner_tls_key' private claim (e.g., a parameter or attribute) indicating an TLS certificate parameter to inspect (e.g., a SAN extension IP address parameter or san.ipAddress) and an 'owner_tls_value' private claim indicating a value for the TLS certificate parameter (e.g., '233.156.42.62') identifying the owner of the access token. In another example, when generating or issuing an access token, NF 400 acting as NRF 100 may add an 'owner_tls_key' private claim (e.g., a parameter or attribute) indicating an TLS certificate parameter to inspect (e.g., a SAN extension DNS name parameter or san.dNSName) and an 'owner_tls_value' private claim indicating a value for the TLS certificate parameter (e.g., 'SMF1.site1.com') identifying the owner of the access token.

NF 400 may access (e.g., read from and/or write information to) data storage 406. Data storage 406 may be any suitable entity (e.g., a computer readable medium or memory) for storing various data. In some embodiments, data storage 406 may include ownership information of access tokens. For example, data store 406 may include data records or entries indicating associations between NF instance identifiers and various ownership information to be included in respective access tokens. In another example, data storage 406 may include network operator settings or preferences regarding aspects associated with detecting stolen or compromised access tokens and/or related mitigation actions.

In some embodiments, data storage 406 may include logic for performing various aspects of access token authorization and/or security procedures for detecting stolen access tokens. For example, data storage 406 may include ownership verification logic for checking that ownership information in an access token matches TLS certificate data provided by the sender of the access token and may also include trust token verification logic for checking that ownership information in trust token matches TLS certificate data provided by the sender of the trust token.

It will be appreciated that FIG. 4 and its related description are for illustrative purposes and that NF 400 may include additional and/or different modules, components, or functionality.

Figure 5:
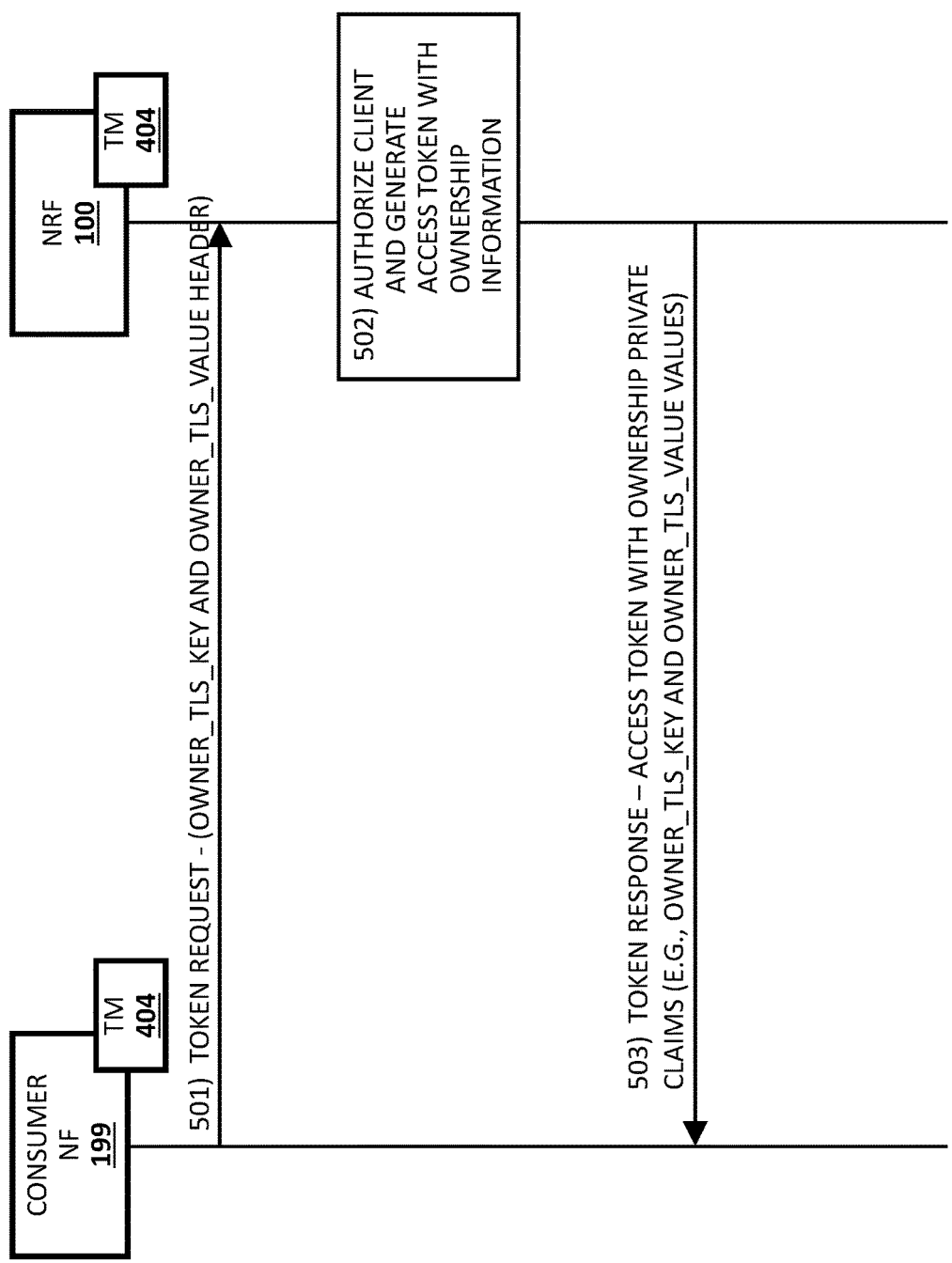
FIG. 5 is a message flow diagram illustrating a scenario involving a consumer NF providing ownership information when requesting an access token from an NRF.

FIG. 5 is a message flow diagram illustrating a scenario 500 involving consumer NF 199 obtaining an access token with ownership information from NRF 100. As shown, FIG. 5 depicts NRF 100 comprising TM 404. In some embodiments, TM 404 may perform various aspects associated with generating an access token with ownership information (e.g., information for identifying consumer NF 199 that requested the access token) and providing the access token with the ownership information.

In some embodiments, consumer NF 199 may include TM 404 or related functionality for sending ownership information in a header of a token request when requesting an access token from NRF 100. Consumer NF 199 and/or TM 404 may also include functionality for using the trust token when generating and sending SBI messages (e.g., service requests). For example, consumer NF 199 may send a service request with an access token comprising ownership information for indicating a TLS parameter to use for verifying the owner of the access token. In this example, the ownership information may also include a value for the TLS parameter that identifies consumer NF 199 as the owner of the access token. Continuing with this example, a first hop NF may use the ownership information in the access token and data from a TLS certificate associated with consumer NF 199 to verify that the access token is not stolen.

Referring to FIG. 5, in step 501, consumer NF 199 may send a token request message (e.g., an Nnrf_AccessToken_Get request message) for requesting an access token (e.g., an OAuth 2.0 access token) to NRF 100 (e.g., acting as an OAuth 2.0 authorization server). The Nnrf_AccessToken_Get request message may include expected service names, a producer NF type, a consumer NF type, a client ID, and other parameters.

In some embodiments, a token request message may include ownership information for indicating a TLS parameter to use in verifying that an access token is not stolen and for indicating a value or identifier that identifies the owner of the access token. For example, consumer NF 199 may generate an Nnrf_AccessToken_Get request message with an ownership header including an 'owner_tls_key' value (e.g., parameter or attribute) indicating an TLS certificate parameter to inspect (e.g., a SAN extension IP address parameter) for a value to compare to a value in the access token when verifying ownership of the access token and an owner_tls_value value indicating a value for the TLS certificate parameter (e.g., '123.56.32.65') that identifies consumer NF 199 as the owner of the access token. In this example, by providing ownership information, consumer NF 199 may indicate which TLS parameter is inspected when verifying the ownership of the requested access token.

In step 502, NRF 100 may authorize consumer NF 199 (e.g., using client ID and/or other parameters) and may generate an access token (e.g., an OAuth 2.0 access token) with ownership information or related attributes (e.g., an 'owner_tls_key' private claim and/or an 'owner_tls_value' private claim).

In some embodiments, NRF 100 and/or a module therein (e.g., TM 404) may be configured to add ownership information to an access token using an ownership header received from consumer NF 199. For example, NRF 100 and/or a module therein (e.g., TM 404) may generate private claims of an access token indicating ownership information based on explicit ownership information provided by consumer NF 199 in an ownership header of a token request message.

In some embodiments, NRF 100 and/or a module therein (e.g., TM 404) may be configured to add ownership information (e.g., an 'owner_tls_key' and 'owner_tls_value' private claims) to an access token when the access token is requested by consumer NF 199 (e.g., without consumer NF 199 explicitly providing the ownership information). For example, as part of a token request, 'nfInstanceId' is mandatory parameter that indicates an NF instance identifying consumer NF 199. In this example, if a network operator enables an access token to utilize a SAN extension for indicating an NF instance ID identifying consumer NF 199 in a registeredID or otherName parameter, then NRF 100 may use the value in the mandatory 'nfInstanceId' parameter as ownership information in the access token (e.g., an 'owner_tls_key' private claim of the access token may indicate 'san.registeredID' or 'san.otherName' (depending on a network operator setting or preference, e.g., based on NF type or location) and an 'owner_tls_value' private claim of the access token may indicate the value of the 'nfInstanceId' parameter provided by consumer NF 199 in the access token request.

In step 503, NRF 100 may send the access token with the ownership information to consumer NF 199 in a token response message (e.g., an Nnrf_AccessToken_Get response). In some embodiments, an access token may include an 'owner_tls_key' private claim, an 'owner_tls_value' private claim, and/or other attributes or claims.

In some embodiments, when consumer NF 199 wants to request a service from producer NF 299, consumer NF 199 may send a service request that includes an access token with ownership information toward producer NF 299. In such embodiments, a first hop NF (e.g., the NF that receives the service request directly from consumer NF 199 via a TLS connection) may receive a service request including an access token with ownership information and may verify that the access token is not stolen, e.g., by comparing at least some ownership information in the access token (e.g., an IP address or DNS name that identifies the owner of the access token) to an actual TLS parameter value of a TLS certificate (e.g., received from consumer NF 199 when a TLS connection was established between consumer NF 199 and the first hop NF).

In some embodiments, e.g., when TLS data changes in a TLS certificate (e.g., data used in access token ownership verification changes), consumer NF 199 may reject existing access tokens and get fresh set of access tokens with the updated ownership information for subsequent service requests.

It will be appreciated that FIG. 5 is for illustrative purposes and that different and/or additional actions may be performed. It will also be appreciated that various actions described herein relating to FIG. 5 may occur in a different order or sequence.

Figure 6:
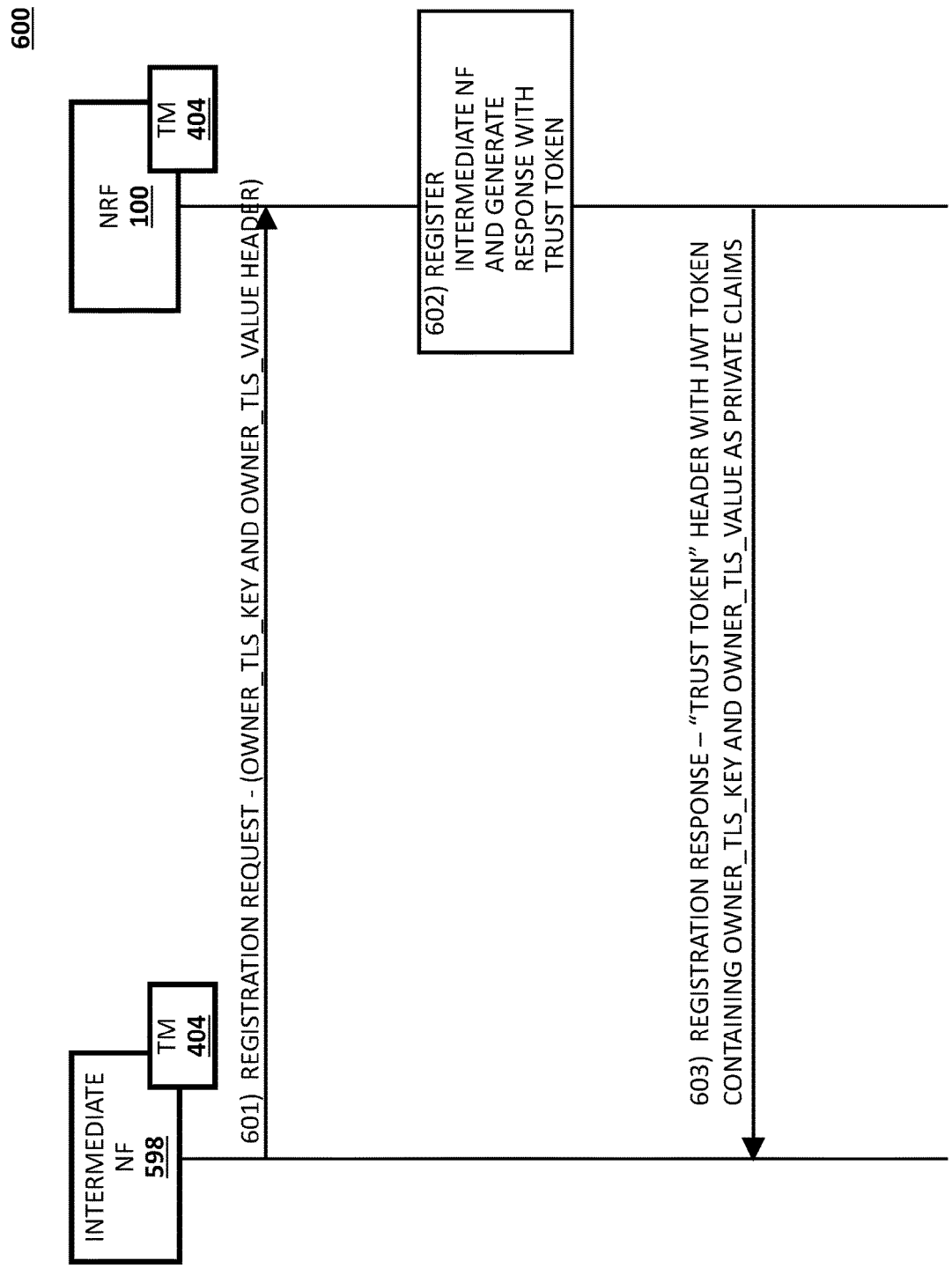
FIG. 6 is a message flow diagram illustrating a scenario involving an intermediate NF providing ownership information when registering with an NRF.

FIG. 6 is a message flow diagram illustrating a scenario 600 involving an intermediate NF 598 (e.g., SCP 101, SEPP 126, or a proxy NF) providing ownership information when registering with NRF 100. As shown, FIG. 6 depicts NRF 100 comprising TM 404. In some embodiments, TM 404 may perform various aspects associated with generating a trust token (e.g., an OAuth 2.0 access token or a JWT) that includes ownership information (e.g., information for identifying intermediate NF 598 to a next hop NF) in response to a registration request and providing the trust token with the ownership information to the registering NF.

In some embodiments, intermediate NF 598 may include TM 404 or related functionality for sending ownership information in a header of a registration request, e.g., when registering with NRF 100. Intermediate NF 598 and/or TM 404 may also include functionality for using the trust token when forwarding SBI messages onward. For example, intermediate NF 598 may use a trust token for indicating to a next hop (e.g., a second intermediate NF or producer NF 299) that an access token in a related message has previously been verified as belonging to the original sender and, as such, the next hop may verify the trust token. in this example, the next hop may be configured to verify the trust token in lieu of performing the access token ownership verification procedure.

Referring to FIG. 6, in step 601, intermediate NF 598 may send a registration request message (e.g., an Nnrf_NFManagement_NFRegister request message) for registering with NRF 100. The Nnrf_NFManagement_NFRegister request message may include an NF instance ID, connection or access information, and/or other parameters.

In some embodiments, a registration request message may include ownership information for indicating a TLS parameter to use in verifying that a trust token is not stolen and indicating a value or identifier that identifies the owner of the trust token. For example, intermediate NF 598 may generate an Nnrf_NFManagement_NFRegister request message with an ownership header including an 'owner_tls_key' value (e.g., parameter or attribute) indicating an TLS certificate parameter to inspect (e.g., a SAN extension DNS name parameter) and an owner_tls_value value indicating a value for the TLS certificate parameter (e.g., 'SEPP1.site.com') that identifies intermediate NF 598 as the owner of the trust token.

In step 602, NRF 100 may authorize the registration request and register intermediate NF 598 (e.g., using the NF instance ID, connection or access information, and/or other parameters) and may generate a trust token (e.g., an OAuth 2.0 access token or a JWT) with ownership information or related attributes (e.g., an 'owner_tls_key' private claim and/or an 'owner_tls_value' private claim) and may include the trust token as a header of a registration response message.

In some embodiments, NRF 100 and/or a module therein (e.g., TM 404) may be configured to add ownership information to a trust token using an ownership header received from intermediate NF 598. For example, NRF 100 and/or a module therein (e.g., TM 404) may generate private claims of a trust token indicating ownership information based on explicit ownership information provided by intermediate NF 598 in an ownership header of a registration request message.

In some embodiments, NRF 100 and/or a module therein (e.g., TM 404) may be configured to add ownership information (e.g., an 'owner_tls_key' and 'owner_tls_value' private claims) to a trust token when intermediate NF 598 is registering with NRF 100 (e.g., without intermediate NF 598 explicitly providing the ownership information). For example, as part of a registration request, 'nfInstanceId' is mandatory parameter that indicates an NF instance identifying intermediate NF 598. In this example, if a network operator enables a trust token to utilize a SAN extension for indicating an NF instance ID identifying intermediate NF 598 in a registeredID or otherName parameter, then NRF 100 may use the value in the mandatory 'nfInstanceId' parameter as ownership information in the trust token (e.g., an 'owner_tls_key' private claim of the trust token may indicate 'san.registeredID' or 'san.otherName' (depending on a network operator setting or preference, e.g., based on NF type or location) and an 'owner_tls_value' private claim of the trust token may indicate the value of the 'nfInstanceId' parameter provided by intermediate NF 598 in the registration request.

In step 603, NRF 100 may send the trust token with the ownership information to intermediate NF 598 as a header of a registration response message. In some embodiments, a trust token may include an 'owner_tls_key' private claim, an 'owner_tls_value' private claim, and/or other attributes or claims.

In some embodiments, e.g., after intermediate NF 598 has verified that the access token of a service request is not stolen, intermediate NF 598 may add a trust token (as a header) to the service request before forwarding it onward. In such embodiments, the trust token may indicate to a next hop (e.g., a second intermediate NF 598 or producer NF 299) that an access token in a related message has previously been verified as belonging to the original sender (e.g., the NF originating the service request) and, as such, the next hop may bypass the access token ownership verification procedure.

In some embodiments, e.g., in lieu of verifying the ownership of an access token associated with a service request, a next hop NF (e.g., an NF immediately following intermediate NF 598) may verify a trust token if the service request. For example, a next hop NF may receive a service request with an access token and a trust token. In this example, the next hop NF may verify the trust token, e.g., by comparing at least some ownership information in the trust token (e.g., an IP address or DNS name that identifies the owner of the access token) to an actual TLS parameter value of a TLS certificate (e.g., received from intermediate NF 598 when a TLS connection was established between intermediate NF 598 and the next hop NF).

In some embodiments, e.g., when TLS data changes in a TLS certificate (e.g., data used in access token ownership verification), intermediate NF 598 may send updated ownership information (e.g., an updated 'owner_tls_key' value and/or an 'owner_tls_value' value) in an NRF heartbeat or NFUpdate message, to get the updated trust token in a corresponding message.

It will be appreciated that FIG. 6 is for illustrative purposes and that different and/or additional actions may be performed. It will also be appreciated that various actions described herein relating to FIG. 6 may occur in a different order or sequence.

Figure 7:
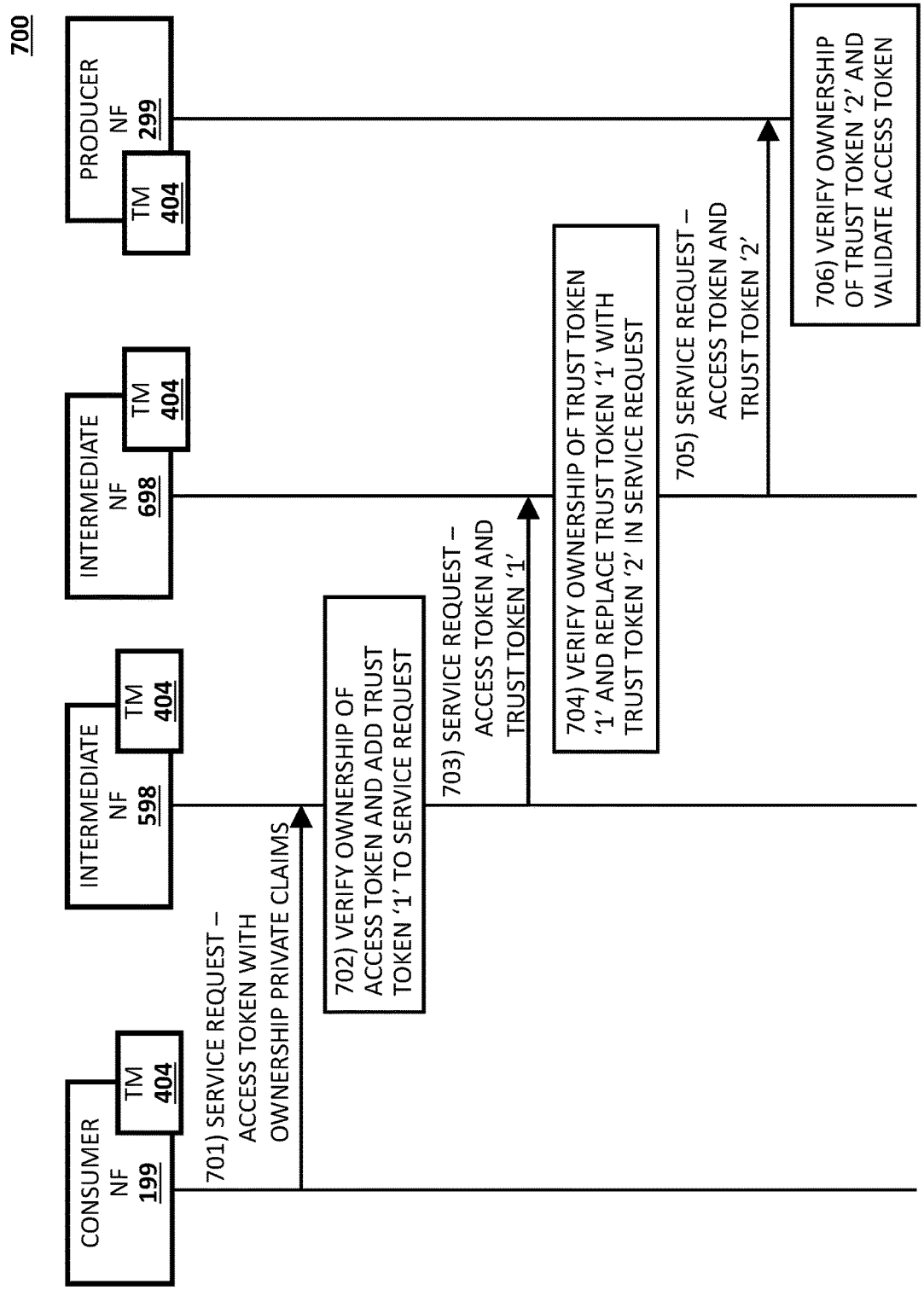
FIG. 7 is a message flow diagram illustrating a scenario involving a consumer NF sending a service request to a producer NF via intermediate NFs.

FIG. 7 is a message flow diagram illustrating a scenario 700 involving consumer NF 199 sending a service request to producer NF 299 via intermediate NFs 598 and 698. As shown, FIG. 7 depicts various NFs comprising TM 404 or related functionality. In some embodiments, TM 404 may perform various aspects associated with verifying ownership of an access token (or a trust token) using ownership information in the access token (or the trust token) and TLS information from a TLS certificate associated with a sender of a message (e.g., a service request message) including the access token (or the trust token). In some embodiments, TM 404 (e.g., at intermediate NF 598 or 698) may perform various aspects associated with adding or replacing trust tokens in a header of a service request prior to forwarding or sending the service request including an access token to a next hop.

In some embodiments, scenario 700 may represent an indirect communication scenario (e.g., communications model C or D defined in 3GPP Technical Specification (TS) 23.501). In some embodiments, scenario 700 may represent an inter-PLMN routing scenario. For example, consumer NF 199 may represent an NF in a V-PLMN; intermediate NF 598 may represent a proxy NF (e.g., SEPP 126 and/or SCP 101) in the V-PLMN; intermediate NF 698 may represent a proxy NF (e.g., SEPP 126 and/or SCP 101) in the H-PLMN; and producer NF 299 may represent an NF in the H-PLMN. In this example, when consumer NF 199 sends a service request destined for producer NF 299, the first hop may be intermediate NF 598, the second hop may be intermediate NF 698, and the third and final hop may be producer NF 299.

Referring to FIG. 7, prior to step 701, TLS connections may be established between consecutive hops, e.g., a TLS connection between consumer NF 199 and intermediate NF 598, another TLS connection between intermediate NF 598 and intermediate NF 698, and another TLS connection between intermediate NF 698 and producer NF 299. For each TLS connection established, the respective NFs may exchange TLS certificates comprising various information. For example, each exchanged TLS certificate may include one or more attributes (e.g., SAN extension parameter values) capable of uniquely identifying its respective NF. In this example, the SAN extension parameters may include or indicate an IP address, a DNS name, a registered ID (e.g., an NF instance identifier), or another name (e.g., an email address or another identifier). Continuing with this example, TLS certificate data (e.g., a DNS name) of consumer NF 199 (or the previous hop) and ownership information (e.g., a custom attribute indicating an DNS name of the token owner) in an access token (or trust token) may indicate whether the service request or access token thereof has been stolen or compromised.

In step 701, consumer NF 199 may send, via a TLS connection, a service request including an access token with ownership information (e.g., 'owner_tls_key' value and/or an 'owner_tls_value' value) to intermediate NF 598 for delivery to producer NF 299.

In step 702, intermediate NF 598 may receive the service request including the access token with the ownership information and may use the ownership information to verify ownership of the access token; and, after verifying the ownership of the access token, intermediate NF 598 may add a trust token '1' as a header to the service request for indicating that intermediate NF 598 has verified the ownership of the access token and may include identification information (e.g., ownership information) for identifying intermediate NF 598 as the trust token's owner or subject.

In some embodiments, intermediate NF 598 or TM 404 therein may perform an ownership verification procedure to verify ownership of an access token. For example, an ownership verification procedure may involve using ownership information of the access token to identify a value for a TLS parameter that is associated with or identifies the owner of the access token and then obtaining a TLS parameter value (indicated by the ownership information in the access token) from the TLS certificate (e.g., obtained from consumer NF 199 during the TLS handshake protocol). If the two values match (e.g., the values are equal or the same), then intermediate NF 598 or TM 404 therein may determine that consumer NF 199 is the true owner of the access token. However, if the two values do not match (e.g., the values are different), then intermediate NF 598 or TM 404 therein may determine that consumer NF 199 is not the true owner of the access token (e.g., that the access token is stolen or compromised) and may perform a mitigation action (e.g., sending an error response message back toward consumer NF 199).

In step 703, intermediate NF 598 may send, via a TLS connection, the service request including the access token and the trust token '1' to intermediate NF 698.

In step 704, intermediate NF 698 may receive the service request including the access token and the trust token '1' and may use the ownership information in the trust token '1' to verify ownership (or the subject) of the trust token; and, after verifying the ownership (or the subject) of the trust token, intermediate NF 698 may replace the trust token '1' with a trust token '2' including identification information (e.g., ownership information) for identifying intermediate NF 698 as the trust token's owner or subject.

In some embodiments, intermediate NF 698 or TM 404 therein may perform a trust token verification procedure to verify the owner or subject of a trust token. For example, a trust token verification procedure may involve using ownership information of a trust token '1' to identify a value for a TLS parameter that is associated with or identifies the owner of the trust token and then obtaining a TLS parameter value (indicated by the ownership information in the trust token) from the TLS certificate (e.g., obtained from intermediate NF 598 during the TLS handshake protocol). If the two values match (e.g., the values are equal or the same), then intermediate NF 698 or TM 404 therein may determine that intermediate NF 598 is the true owner or subject of the trust token '1'. However, if the two values do not match (e.g., the values are different), then intermediate NF 698 or TM 404 therein may determine that intermediate NF 598 is not the true owner or subject of the trust token (e.g., that the trust token is stolen or compromised) and may perform a mitigation action (e.g., sending an error response message back toward consumer NF 199).

In step 705, intermediate NF 698 may send, via a TLS connection, the service request including the access token and the trust token '2' to producer NF 299.

In step 706, producer NF 299 may receive the service request including the access token and the trust token '2' and may use the ownership information in the trust token '2' to verify ownership (or the subject) of the trust token; and, after verifying the ownership (or the subject) of the trust token, producer NF 299 may perform an additional verification or validation of the access token.

In some embodiments, producer NF 299 or TM 404 therein may perform a trust token verification procedure to verify the owner or subject of a trust token. For example, a trust token verification procedure may involve using ownership information of a trust token '2' to identify a value for a TLS parameter that is associated with or identifies the owner of the trust token and then obtaining a TLS parameter value (indicated by the ownership information in the trust token) from the TLS certificate (e.g., obtained from intermediate NF 698 during the TLS handshake protocol). If the two values match (e.g., the values are equal or the same), then producer NF 299 or TM 404 therein may determine that intermediate NF 698 is the true owner or subject of the trust token '2'. However, if the two values do not match (e.g., the values are different), then producer NF 299 or TM 404 therein may determine that intermediate NF 698 is not the true owner or subject of the trust token '2' (e.g., that the trust token is stolen or compromised) and may perform a mitigation action (e.g., sending an error response message back toward consumer NF 199).

In some embodiments, e.g., in lieu of or in addition to verifying ownership of an access token or a trust token, producer NF 299 may validate an access token (e.g., an OAuth 2.0 access token) by ensuring the integrity of the access token including verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In some embodiments, e.g., where an 'allow list' of connections exists for producer NF 299 and indicates that the immediate previous hop (e.g., intermediate NF 698) is trusted, producer NF 299 may skip or bypass a trust token verification procedure for verifying the owner or subject of a trust token associated with a service request. In such embodiments, the ownership verification procedure performed by a first hop in the sequence (e.g., intermediate NF 598) for verifying ownership of an access token in the service request may be sufficient to detect whether the access token is stolen and can be implemented without requiring additional ownership verification logic at producer NF 299.

In some embodiments, after determining that an access token in a service request message was not stolen and/or that the access token is valid, producer NF 299 may allow or grant the service request message, e.g., by sending a service response message including a requested service or related information.

It will be appreciated that FIG. 7 is for illustrative purposes and that different and/or additional actions may be performed. It will also be appreciated that various actions described herein relating to FIG. 7 may occur in a different order or sequence.

Figure 8:
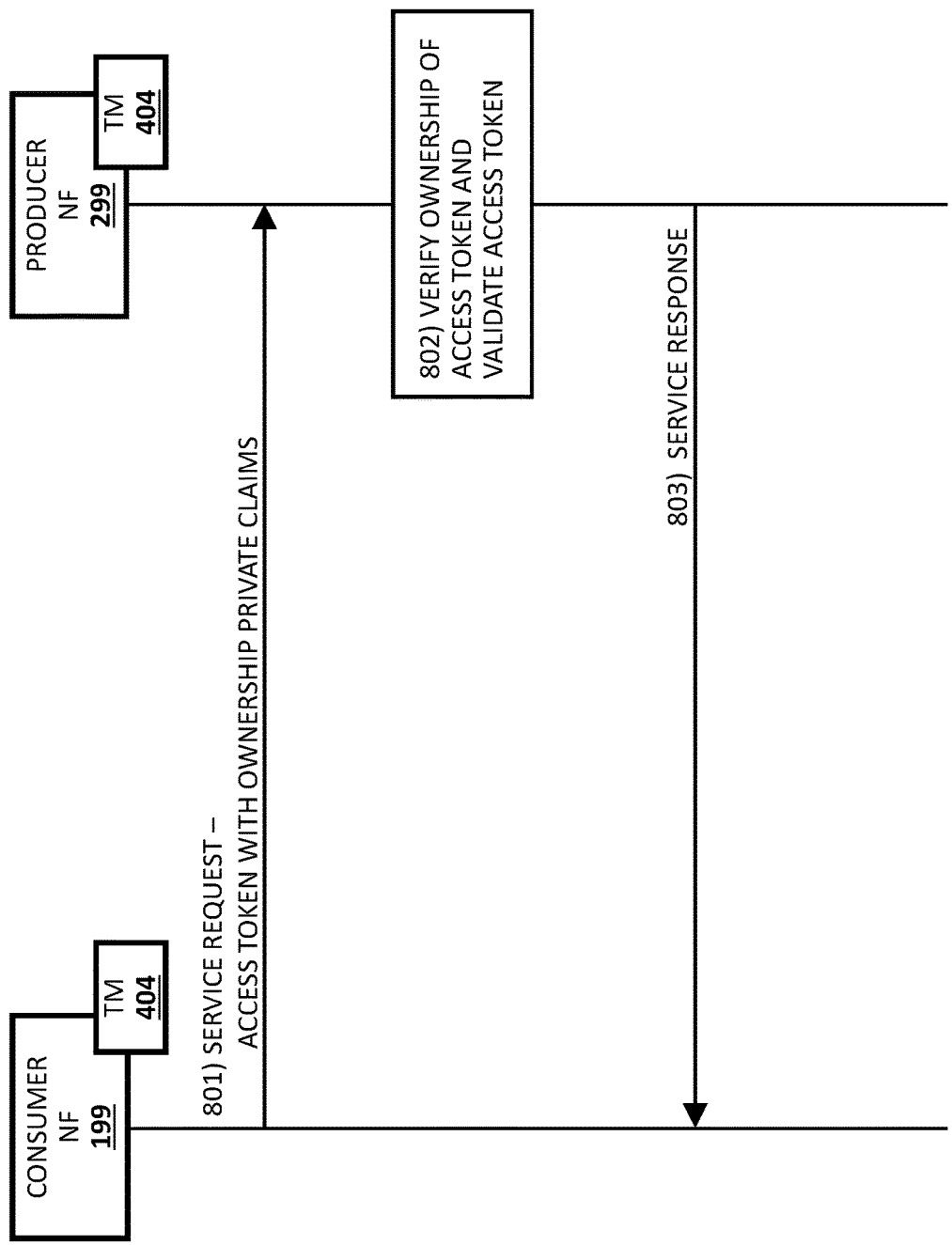
FIG. 8 is a message flow diagram illustrating a scenario involving a NF detecting that an access token in a service request is owned by the requesting entity.

FIG. 8 is a message flow diagram illustrating a scenario 800 involving NF 400 detecting that an access token in a service request is owned by consumer NF 199. As shown, FIG. 8 depicts each of consumer NF 199 and producer NF 299 comprise TM 404. In some embodiments, TM 404 may perform various aspects associated with verifying ownership of an access token using ownership information in the access token and TLS information from a TLS certificate associated with a sender of a message (e.g., a service request message) including the access token.

In some embodiments, producer NF 299 may represent a next hop (e.g., a first hop) from consumer NF 199. For example, in a direct communications scenario (e.g., without intermediate NF(s) 598), producer NF 299 may receive a service request directly from consumer NF 199.

Referring to FIG. 8, prior to step 801, a TLS connection may be established between consumer NF 199 and producer NF 299, wherein the TLS connection is established by exchanging TLS certificates comprising various information. For example, each exchanged TLS certificate may include one or more SAN extension parameter values capable of uniquely identifying its respective NF. In this example, the SAN extension parameters may include or indicate an IP address, a DNS name, a registered ID (e.g., an NF instance identifier), or an other name (e.g., another identifier).

In step 801, consumer NF 199 may send a service request including an access token with ownership information (e.g., 'owner_tls_key' value and/or an 'owner_tls_value' value) to producer NF 299.

In step 802, producer NF 299 may receive the service request including the access token with the ownership information and may use the ownership information to verify or attempt to verify ownership of the access token (e.g., determine or detect that consumer NF 199 is the owner of the access token and/or that the access token was not stolen). For example, producer NF 299 or TM 404 therein may perform an ownership verification procedure involving using ownership information of an access token to identify a value for a TLS parameter that is associated with or identifies the owner of the access token and then obtaining the TLS parameter value from the TLS certificate (e.g., obtained from consumer NF 199 during the TLS handshake protocol). In this example, if the two values match (e.g., the values are equal or the same), then producer NF 299 or TM 404 therein may determine that consumer NF 199 is the true owner of the access token. However, in this example, if the two values do not match (e.g., the values are different), then producer NF 299 or TM 404 therein may determine that consumer NF 199 is not the true owner of the access token (e.g., that the access token is stolen or compromised).

In some embodiments, e.g., in lieu of or in addition to verifying ownership of an access token (e.g., verifying that the access token is not stolen), producer NF 299 may validate an access token (e.g., an OAuth 2.0 access token) by ensuring the integrity of the access token including verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In step 803, after determining that the access token was not stolen and/or that the access token is valid, producer NF 299 may allow or grant the service request message by sending a service response message including a requested service or related information.

It will be appreciated that FIG. 8 is for illustrative purposes and that different and/or additional actions may be performed. It will also be appreciated that various actions described herein relating to FIG. 8 may occur in a different order or sequence.

Figure 9:
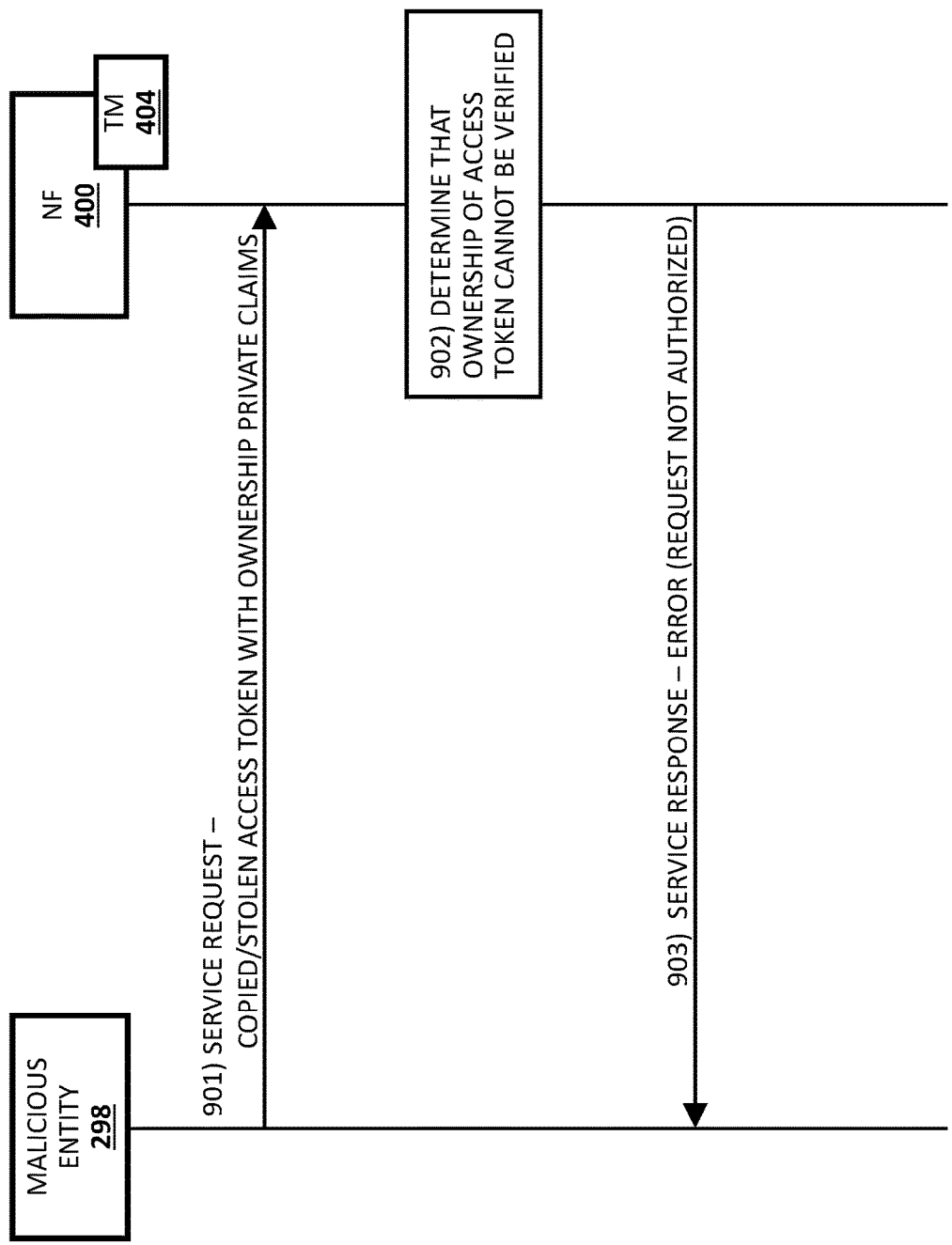
FIG. 9 is a message flow diagram illustrating a scenario involving a NF detecting that an access token in a service request is stolen.

FIG. 9 is a message flow diagram illustrating a scenario 900 involving NF 400 detecting that an access token in a service request is stolen. As shown, FIG. 9 depicts NF 400 comprising TM 404. In some embodiments, TM 404 may perform various aspects associated with verifying ownership of an access token using ownership information in the access token and information from a TLS certificate associated with a sender of a message (e.g., a service request message) including the access token.

In some embodiments, NF 400 may represent a next hop (e.g., a first hop) from malicious entity 298. For example, in a direct communications scenario (e.g., without intermediate NF(s) 598), NF 400 may be producer NF 299 capable of providing service(s) requested by malicious entity 298 and may receive a service request directly from malicious entity 298. In another example, in an indirect communications scenario (e.g., with intermediate NF(s) 598), NF 400 may be a intermediate NF 598 and may be the first hop in a sequence of hops for communications from malicious entity 298 to producer NF 299.

Referring to FIG. 9, prior to step 901, a TLS connection may be established between malicious entity 298 and NF 400, wherein the TLS connection is established by exchanging TLS certificates comprising various information. For example, each exchanged TLS certificate may include one or more SAN extension parameter values capable of uniquely identifying its respective NF. In this example, the SAN extension parameters may include or indicate an IP address, a DNS name, a registered ID (e.g., an NF instance identifier), or another name (e.g., another identifier).

In step 901, malicious entity 298 may steal (e.g., obtain without authorization) an access token with ownership information (e.g., 'owner_tls_key' value and/or an 'owner_tls_value' value) and may send a service request including the access token to NF 400. For example, malicious entity 298 may obtain the access token requested by consumer NF 199 in FIG. 2 by exploiting a network security issue or an application vulnerability.

In step 902, NF 400 may receive the service request including the access token with the ownership information and may use the ownership information to verify or attempt to verify ownership of the access token (e.g., determine or detect that malicious entity 298 is the owner of the access token and/or that the access token was not stolen). For example, NF 400 or TM 404 therein may perform an ownership verification procedure involving using ownership information of an access token to identify a value for a TLS parameter that is associated with or identifies the owner of the access token and then obtaining the TLS parameter value from the TLS certificate (e.g., obtained from consumer NF 199 during the TLS handshake protocol). In this example, if the two values match (e.g., the values are equal or the same), then NF 400 or TM 404 therein may determine that consumer NF 199 is the true owner of the access token. However, in this example, if the two values do not match (e.g., the values are different), then NF 400 or TM 404 therein may determine that malicious entity 298 is not the true owner of the access token (e.g., that the access token is stolen or compromised).

In some embodiments, e.g., in lieu of or in addition to verifying ownership of an access token, NF 400 may validate the access token (e.g., an OAuth 2.0 access token) by ensuring the integrity of the access token including verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In step 903, after determining that the access token is stolen, NF 400 may reject the service request message by sending a service response message indicating an error code or related error, e.g., request not authorized, access token is compromised, etc.

It will be appreciated that FIG. 9 is for illustrative purposes and that different and/or additional actions may be performed. It will also be appreciated that various actions described herein relating to FIG. 9 may occur in a different order or sequence.

FIG. 10 is a diagram that depicts example ownership data 1000 usable for determining ownership attributes for access tokens. Data 1000 may include information (e.g., a TLS parameter or key and a value for the TLS parameter that identifies the owner of the access token) usable for determining or identifying appropriate ownership information for various access tokens (e.g., a trust token, a JWT, or an OAuth 2.0 access token). In some embodiments, data 1000 or portions thereof may be predetermined or provisioned by a network operator. In some embodiments, data 1000 or portions thereof may be received or generated during a registration procedure or an access token request procedure.

In some embodiments, data 1000 may be utilized when NRF 100 or an entity with similar functionality (e.g., NF 400) is configured to add ownership attributes (e.g., an 'owner_tls_key' value and an 'owner_tls_value' value) automatically to access tokens (e.g., OAuth 2.0 access tokens) when the access tokens are requested by consumer NFs. For example, data 1000 may include or represent default ownership attributes (e.g., derived from NF registration information or provided by network operators) for particular NFs, types of NFs, or locations of NFs. In this example, default ownership attributes or related information at NRF 100 or an entity with similar functionality may allow consumer NFs to forgo logic for requesting an access token with explicit ownership attributes since NRF 100 or an entity with similar functionality may provide relevant ownership attributes in the access token automatically using data 1000.

Referring to FIG. 10, a table representing data 1000 may include columns and/or fields for a NF instance identifier, an ownership or trust key (e.g., an 'owner_tls_key' value), and an ownership or trust value (e.g., an 'owner_tls_value' value). As depicted in FIG. 10, each row may associate an NF instance identifier and ownership information for identifying an owner (e.g., the access token requester) of a corresponding access token.

In some embodiments, an 'NF instance ID' field may store information for identifying a particular NF instance. Example data in the 'NF instance ID' field may include an alphanumeric value or other identifier. In some embodiments, each NF instance identifier may be globally unique inside a public land mobile network (PLMN) where a corresponding NF instance is registered. In some embodiments, the format of an NF instance identifier may be a universally unique identifier (UUID) version 4, as described in IETF RFC 4122. For example, an NF instance identifier 'SCP 1' may represent a 128-bit UUID where 16 bytes (e.g., octets) of the UUID are represented as 32 hexadecimal digits, and where the digits are displayed in five groups separated by hyphens, in the form 8-4-4-4-12 for a total of 36 characters (32 hexadecimal characters and 4 hyphens), e.g., "2967a69a-f61b-4bc1-b9da-47c9c5d14b64". (e.g., 'san.dNSName', 'san.ipAddress', 'san.otherName', or 'san.registeredID'

In some embodiments, an 'ownership/trust key' field may store information for indicating a TLS certificate parameter to inspect when verifying the owner of an access token or trust token. Example data in the 'ownership/trust key' field may include an identifier or other information for identifying a TLS certificate parameter or a related SAN extension parameter, e.g., an IP address, a DNS name, a registered ID (e.g., an NF instance identifier), or an other name. For example, an 'ownership/trust key' field value of 'san.dNSName' may be included in a private claim of a corresponding access token. In this example, the value 'san.dNSName' may indicate (e.g., to a verifying entity like NF 400) that the TLS certificate SAN extension parameter storing a DNS name associated with a sender of a service request should be inspected for a parameter value and that this parameter value in the TLS certificate should be compared to the value in the 'ownership/trust value' private claim when determining whether the sender of a service request including the access token is the owner of the access token.

In some embodiments, an 'ownership/trust value' field may store information for indicating a value for a corresponding TLS certificate parameter that identifies the owner of an access token or trust token. Example data in the 'ownership/trust value' field may include a value or other information usable for identifying an owner of an access token. For example, an 'ownership/trust value' field value of 'SCP1.SITE.COM' may be included in a private claim of a corresponding access token. In this example, the value 'SCP1.SITE.COM' may be compared to the actual DNS name located in a TLS certificate when determining whether the sender of the access token is the owner of the access token.

It will also be appreciated that data 1000 is for illustrative purposes and that different and/or additional data than the data depicted in FIG. 10 may be usable for determining or identifying appropriate ownership information for various access tokens. Further, data 1000 may be stored (e.g., in data storage 406) or managed using various data structures and/or computer readable media.

FIG. 11 is a diagram illustrating an example process 1100 for detecting stolen access tokens. In some embodiments, example process 1100 described herein, or portions (e.g., operations or steps) thereof, may be performed at or performed by NF 400, TM 404, and/or another module, NF, or node. In some embodiments, process 1100 or portions thereof may be performed at or by a first hop NF from a sender of an SBI request message (e.g., a service request) including an access token. For example, in an indirect communication scenario (e.g., a 3GPP defined model C or D scenario), process 1100 or portions thereof may be performed by intermediate NF 598 that receives a service request message from consumer NF 199. In another example, in a direct communication scenario (e.g., a 3GPP defined model B scenario), process 1100 or portions thereof may be performed by producer NF 299 that receives a service request message directly from consumer NF 199.

Referring to process 1100, in step 1102, a service request comprising an access token may be received via a TLS connection and from a sender. In some embodiments, an access token may include ownership information (e.g., as private claims) indicating a TLS parameter for verifying an owner of the access token.

In step 1104, it may be determined, using the ownership information of the access token and TLS information in a TLS certificate obtained from the sender, whether the ownership information and the TLS information matches.

In step 1106, in response to determining that the ownership information and the TLS information do not match, the service request may be rejected.

In some embodiments, process 1100 may occur at an intermediate NF (e.g., intermediate NF 598) between a sender (e.g., consumer NF 199 or malicious entity 298) of a service request and producer NF 299 capable of granting the service request. In such embodiments, the intermediate NF may be configured for: in response to determining that the ownership information and the TLS information match, adding a trust token (e.g., as a header) to the service request, wherein the trust token indicates identification information identifying the NF and sending the service request comprising the access token and the trust token onward to a second intermediate NF (e.g., intermediate NF 698) or producer NF 299.

In some embodiments, a second intermediate NF (e.g., intermediate NF 698) may be configured for: receiving, via a TLS connection and from a first intermediate NF (e.g., intermediate NF 698), a service request comprising an access token and a trust token associated with the first intermediate NF; determining, using the identification information of the trust token and second TLS information in a second TLS certificate obtained from the first intermediate NF, whether the identification information and the second TLS information matches; in response to determining that the identification information and the second TLS information do not match, rejecting the service request; in response to determining that the identification information and the second TLS information matches, replacing the trust token in the service request with a second trust token, wherein the second trust token indicates second identification information identifying the second intermediate NF; and sending the service request comprising the access token and the second trust token onward to producer NF 299.

In some embodiments, producer NF 299 may be configured for: receiving, via a third TLS connection and from a second intermediate NF, a service request comprising an access token and a second trust token associated with the second intermediate NF; determining, using the second identification information of the second trust token and third TLS information in a third TLS certificate obtained from the second intermediate NF, whether the second identification information and the third TLS information matches; in response to determining that the second identification information and the third TLS information do not match, rejecting the service request; in response to determining that the second ownership information and the third TLS information match, validating the service request; determining that the service request is valid; and allowing the service request.

In some embodiments, process 1100 may occur at producer NF 299 capable of granting a service request from consumer NF 199. In such embodiments, producer NF 299 may be configured for: in response to determining that ownership information of an access token and TLS information associated with a sender match, validating the service request; determining that the service request is valid (e.g., using an access token validation procedure); and allowing the service request.

In some embodiments, an access token may include an OAuth 2.0 access token where ownership information for verifying ownership of the OAuth 2.0 access token is in one or more claims of the OAuth 2.0 access token.

In some embodiments, a TLS certificate used in verifying an owner of an access token may be obtained from a sender during a TLS handshake protocol for establishing the TLS connection between the sender and a next hop NF (e.g., NF 400 or intermediate NF 598).

In some embodiments, ownership information in an access token may include a TLS parameter identifier (e.g., a SAN parameter identifier) identifying a TLS parameter (e.g., 'san.dNSName', 'san.ipAddress', 'san.otherName', or 'san.registeredID') in a TLS certificate for verifying the owner of the access token and a value for the TLS parameter (e.g., 'amf1.site1.com', '234.45.23.44', '34435FE46754bf@site.com', or 'amf-1323534523') that identifies the owner of the access token. For example, a first hop NF may obtain an 'owner_tls_key' value in a private claim of an access token. In this example, the 'owner_tls_key' value may indicate a TLS parameter or a field name of a TLS certificate from which the first hop NF should obtain a value. Continuing with this example, the first hop NF may compare the obtained value from the TLS certificate and a value from an 'owner_tls_value' value in another private claim of an access token and, if the two values do not match, the first hop NF may determine that the access token is stolen.

In some embodiments, an TLS parameter of a TLS certificate (e.g., that s inspected or used in determining whether an access token is stolen) may include a SAN extension parameter, an IP address, a DNS name, a URI, an NF instance identifier, or an email address.

In some embodiments, NRF 100 may be configured for: prior to a NF (e.g., NF 400) receiving a service request: receiving, from a second NF (e.g., consumer NF 199), an access token request, wherein the access token request may include information indicating ownership information; generating an access token including the ownership information; and sending the access token to the second NF. In such embodiments, the second NF (e.g., the owner of the access token) may be the sender of the service request or the second NF may be different from the sender of the service request.

In some embodiments, an NF for performing process 1100 (e.g., NF 400 or intermediate NF 598) may include SCP 101, SEPP 126, a proxy NF, an intermediate NF, or producer NF 299.

It will be appreciated that process 1100 is for illustrative purposes and that different and/or additional actions may be performed. It will also be appreciated that various actions described herein related to process 1100 may occur in a different order or sequence.

It will be appreciated that while some aspects of the subject matter described herein has been discussed with reference to 5G networks various other networks may utilize some aspects of the subject matter described herein. For example, any network that allows or utilizes access tokens with customizable attributes or claims may use features, systems, mechanisms, and/or techniques described herein to indicate ownership information for mitigating usage of stolen or compromised access tokens.

It should be noted that NF 400, TM 404, and/or functionality described herein may constitute a special purpose computing device. Further, NF 400, TM 404, and/or functionality described herein can improve the technological field of network communications. For example, NF 400 may include TM 404 and may be capable of rejecting service requests (e.g., CRUD calls) that are associated with an access token that is stolen or compromised, thereby allowing NF 400 (e.g., producer NF 299, SCP 101, SEPP, 126, etc.) to mitigate various attacks or misuses involving stolen or compromised access tokens (e.g., stolen by malicious entity 298).

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 33.501; 3rd Generation Partnership Project; Technical Specification Group Services and System Aspects; Security architecture and procedures for 5G system; (Release 16); V16.8.0 (2021-09).
2. 3GPP TS 29.510; 3rd Generation Partnership Project; Technical Specification Group Core Network and Terminals; 5G System; Network Function Repository Services; Stage 3 (Release 16); V16.9.0 (2021-09).
3. Jones, M., Bradley, J., and N. Sakimura, "JSON Web Token (JWT)", IETF RFC 7519, May 2015.
4. Dierks, T. and E. Rescorla, "The Transport Layer Security (TLS) Protocol Version 1.2", IETF RFC 5246, August 2008.
5. Hardt et al., "The OAuth 2.0 Authorization Framework", IETF RFC 6749, October 2012.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting stolen access tokens, the method comprising:
   at a network function (NF) comprising at least one processor:
   receiving, via a transport layer security (TLS) connection and from a sender, a service request comprising an access token, wherein the access token includes ownership information indicating a TLS parameter for verifying an owner of the access token;
   determining, using the ownership information of the access token and TLS information in a TLS certificate obtained from the sender, whether the ownership information and the TLS information matches;
   in response to determining that the ownership information and the TLS information do not match, rejecting the service request;
   at the NF, wherein the NF is an intermediate NF between the sender and a producer NF:
   in response to determining that the ownership information and the TLS information match, adding a trust token to the service request, wherein the trust token indicates identification information identifying the NF; and
   sending the service request comprising the access token and the trust token onward to a second intermediate NF or the producer NF; and
   at the second intermediate NF:
   receiving, via a second TLS connection and from the NF, the service request comprising the access token and the trust token;
   determining, using the identification information of the trust token and second TLS information in a second TLS certificate obtained from the NF, whether the identification information and the second TLS information matches;
   in response to determining that the identification information and the second TLS information do not match, rejecting the service request;
   in response to determining that the identification information and the second TLS information match, replacing the trust token in the service request with a second trust token, wherein the second trust token indicates second identification information identifying the second intermediate NF; and
   sending the service request comprising the access token and the second trust token onward to the producer NF.
2. The method of claim 1 comprising:
   at the producer NF:

receiving, via a third TLS connection and from the second intermediate NF, the service request comprising the access token and the second trust token;

determining, using the second identification information of the second trust token and third TLS information in a third TLS certificate obtained from the second intermediate NF, whether the second identification information and the third TLS information matches;

in response to determining that the second identification information and the third TLS information do not match, rejecting the service request;

in response to determining that the second identification information and the third TLS information match, validating the service request;

determining that the service request is valid; and allowing the service request.

3. The method of claim 1 wherein the access token includes an open authorization (OAuth) 2.0 access token and the ownership information is stored as one or more attributes of the OAuth 2.0 access token, and wherein the TLS certificate is obtained from the sender during a TLS handshake protocol for establishing the TLS connection between the sender and the NF.

4. The method of claim 3 wherein the ownership information is stored as one or more custom attributes or private claims of the access token.

5. The method of claim 1 comprising:

at an NF repository function (NRF) and prior to the NF receiving the service request:

receiving, from a second NF, an access token request, wherein the access token request includes information indicating the ownership information generating the access token including the ownership information; and sending the access token to the second NF, wherein the second NF is the sender of the service request or the second NF is different from the sender of the service request.

6. The method of claim 1 wherein the NF includes a service communication proxy (SCP), a security edge protection proxy (SEPP), a proxy NF, or a producer NF.

7. A system for detecting stolen access tokens, the system comprising:

at least one processor;

a memory; and a network function (NF) implemented using the at least one processor and the memory, the NF configured for:

receiving, via a transport layer security (TLS) connection and from a sender, a service request comprising an access token, wherein the access token includes ownership information indicating a TLS parameter for verifying an owner of the access token;

determining, using the ownership information of the access token and TLS information in a TLS certificate obtained from the sender, whether the ownership information and the TLS information matches; and in response to determining that the ownership information and the TLS information do not match, rejecting the service request, wherein the NF is an intermediate NF between the sender and a producer NF, the NF configured for:

in response to determining that the ownership information and the TLS information match, adding a trust token to the service request, wherein the trust token indicates identification information identifying the NF; and sending the service request comprising the access token and the trust token onward to a second intermediate NF or the producer NF; and the second intermediate NF configured for:

receiving, via a second TLS connection and from the NF, the service request comprising the access token and the trust token;

determining, using the identification information of the trust token and second TLS information in a second TLS certificate obtained from the NF, whether the identification information and the second TLS information matches;

in response to determining that the identification information and the second TLS information do not match, rejecting the service request;

in response to determining that the identification information and the second TLS information matches, replacing the trust token in the service request with a second trust token, wherein the second trust token indicates second identification information identifying the second intermediate NF; and sending the service request comprising the access token and the second trust token onward to the producer NF.

8. The system of claim 7 wherein:

the producer NF is configured for:

receiving, via a third TLS connection and from the second intermediate NF, the service request comprising the access token and the second trust token;

determining, using the second identification information of the second trust token and third TLS information in a third TLS certificate obtained from the second intermediate NF, whether the second identification information and the third TLS information matches;

in response to determining that the second identification information and the third TLS information do not match, rejecting the service request;

in response to determining that the second identification information and the third TLS information match, validating the service request;

determining that the service request is valid; and allowing the service request.

9. The system of claim 7 wherein the access token includes an open authorization (OAuth) 2.0 access token and the ownership information is stored as one or more attributes of the OAuth 2.0 access token, and wherein the TLS certificate is obtained from the sender during a TLS handshake protocol for establishing the TLS connection between the sender and the NF.

10. The system of claim 9 wherein the ownership information is stored as one or more custom attributes or private claims of the access token.

11. The system of claim 10 wherein the TLS parameter includes or indicates a subject alternative names extension parameter, an internet protocol (IP) address, a domain name system (DNS) name, a uniform resource identifier (URI), an NF instance identifier, or an email address.

12. The system of claim 7 comprising:

an NF repository function (NRF) configured for:

prior to the NF receiving the service request:

receiving, from a second NF, an access token request, wherein the access token request includes information indicating the ownership information generating the access token including the ownership information; and sending the access token to the second NF, wherein the second NF is the sender of the service request or the second NF is different from the sender of the service request.

13. The system of claim 7 wherein the NF includes a service communication proxy (SCP), a security edge protection proxy (SEPP), a proxy NF, an intermediate NF, or a producer NF.

14. A non-transitory computer readable medium having stored thereon executable instructions that when executed by at least one processor of a network function (NF) cause the NF to perform steps comprising:

receiving, via a transport layer security (TLS) connection and from a sender, a service request comprising an access token, wherein the access token includes ownership information indicating a TLS parameter for verifying an owner of the access token;

determining, using the ownership information of the access token and TLS information in a TLS certificate obtained from the sender, whether the ownership information and the TLS information matches;

in response to determining that the ownership information and the TLS information do not match, rejecting the service request;

at the NF, wherein the NF is an intermediate NF between the sender and a producer NF capable of granting the service request:

in response to determining that the ownership information and the TLS information match, adding a trust token to the service request, wherein the trust token indicates identification information identifying the NF; and sending the service request comprising the access token and the trust token onward to a second intermediate NF or the producer NF; and at the second intermediate NF:

receiving, via a second TLS connection and from the NF, the service request comprising the access token and the trust token;

determining, using the identification information of the trust token and second TLS information in a second TLS certificate obtained from the NF, whether the identification information and the second TLS information matches;

in response to determining that the identification information and the second TLS information do not match, rejecting the service request;

in response to determining that the identification information and the second TLS information matches, replacing the trust token in the service request with a second trust token, wherein the second trust token indicates second identification information identifying the second intermediate NF; and sending the service request comprising the access token and the second trust token onward to the producer NF.

* * * * *